(12) United States Patent
Narravula et al.

(10) Patent No.: US 12,299,705 B2
(45) Date of Patent: May 13, 2025

(54) METHOD AND SYSTEM FOR AUTOMATIC DETECTION AND PREVENTION OF QUALITY ISSUES IN ONLINE EXPERIMENTS

(71) Applicant: YAHOO AD TECH LLC, Dulles, VA (US)

(72) Inventors: Sundeep Narravula, Sunnyvale, CA (US); Nirupama Appikatala, San Jose, CA (US); Sudhir Chauhan, Sunnyvale, CA (US); Miao Chen, Sunnyvale, CA (US)

(73) Assignee: YAHOO AD TECH LLC, Dulles, VA (US)

( * ) Notice: Subject to any disclaimer, the term of this patent is extended or adjusted under 35 U.S.C. 154(b) by 721 days.

(21) Appl. No.: 15/370,697

(22) Filed: Dec. 6, 2016

(65) Prior Publication Data

US 2018/0158082 A1 Jun. 7, 2018

(51) Int. Cl.
*G06Q 30/0203* (2023.01)
*G06Q 30/0251* (2023.01)

(52) U.S. Cl.
CPC ..... *G06Q 30/0203* (2013.01); *G06Q 30/0254* (2013.01)

(58) Field of Classification Search
CPC ............ G06Q 30/0203; G06Q 30/0254
USPC ........................................... 705/7.32
See application file for complete search history.

(56) References Cited

U.S. PATENT DOCUMENTS

| | | | | |
|---|---|---|---|---|
| 8,090,703 | B1* | 1/2012 | Agarwal | G06F 17/30445 |
| | | | | 707/661 |
| 8,234,632 | B1* | 7/2012 | Hugeback | G06F 11/3495 |
| | | | | 717/130 |
| 2010/0146144 | A1* | 6/2010 | Audenaert | G06Q 30/02 |
| | | | | 709/235 |
| 2015/0039424 | A1* | 2/2015 | Narravula | G06Q 30/0255 |
| | | | | 705/14.53 |
| 2016/0103758 | A1* | 4/2016 | Zhao | G06F 8/65 |
| | | | | 717/124 |
| 2016/0253311 | A1* | 9/2016 | Xu | H04L 67/02 |
| | | | | 715/256 |
| 2017/0046622 | A1* | 2/2017 | Gaither | G06F 17/30699 |
| 2017/0104683 | A1* | 4/2017 | Parthasarathy | H04L 41/145 |

(Continued)

OTHER PUBLICATIONS

Online controlled experiments at large scale R Kohavi, A Deng, B Frasca, T Walker, Y Xu . . . —Proceedings of the 19th . . . , 2013—dl.acm.org (Year: 2013).*

(Continued)

*Primary Examiner* — Charles Guiliano
(74) *Attorney, Agent, or Firm* — Venable LLP

(57) ABSTRACT

The present teaching relates to managing online experiments. In one example, a plurality of experiment layers is created with respect to a plurality of online users. Each experiment layer includes at least one experiment each of which includes one or more buckets associated with respective features to be experimented on. Each of the plurality of online users is assigned to a corresponding bucket in each experiment layer, such that the user is simultaneously associated with multiple experiments in different layers. User event data related to the plurality of experiment layers are collected from the plurality of online users. One or more contaminated buckets are automatically detected based on the user event data.

21 Claims, 17 Drawing Sheets

(56) References Cited

U.S. PATENT DOCUMENTS

| | | | |
|---|---|---|---|
| 2017/0128838 A1* | 5/2017 | Burge | A63F 13/31 |
| 2017/0318152 A1* | 11/2017 | Chen | H04M 3/42068 |
| 2017/0323329 A1* | 11/2017 | Katariya | G06Q 30/0244 |
| 2017/0323331 A1* | 11/2017 | Malek | G06Q 30/0246 |
| 2017/0330114 A1* | 11/2017 | Ghavamzadeh | G06Q 30/0201 |
| 2017/0364958 A1* | 12/2017 | Kirti | G06Q 30/0269 |
| 2018/0034721 A1* | 2/2018 | Dunn | G06F 17/30902 |

OTHER PUBLICATIONS

"Seven pitfalls to avoid when running controlled experiments on the web" T Crook, B Frasca, R Kohavi . . . —Proceedings of the 15th . . . , 2009—dl.acm.org (Year: 2009).*

Unexpected results in online controlled experiments R Kohavi, R Longbotham—ACM SIGKDD Explorations Newsletter, 2011—dl.acm.org (Year: 2011).*

Controlled experiments for decision-making in e-commerce searchA Goswami, W Han, Z Wang . . . —Big Data (Big Data), 2015 . . . , 2015—ieeexplore.ieee.org (Year: 2015).*

Continuous monitoring of A/B tests without pain: Optional stopping in Bayesian testing A Deng, J Lu, S Chen—Data Science and Advanced Analytics . . . , 2016—ieeexplore.ieee.org (Year: 2016).*

"Decision-based order statistic filters" YH Lee, S Tantaratana—IEEE transactions on acoustics . . . , 1990—(Year: 1990).*

Position bias in paired product tests RL Day—1969—journals.sagepub.com (Year: 1969).* https://en.wikipedia.org/wiki/Statistical_hypothesis_testing, retrieved from the web on Dec. 20, 2019 (Year: 2019).*

Testing for uniformity in multidimensional data SP Smith, AK Jain—IEEE transactions on pattern analysis and . . . , 1984—ieeexplore.ieee.org (Year: 1984).*

Online experimentation diagnosis and troubleshooting beyond aa validation Z Zhao, M Chen, D Matheson . . . —2016 IEEE International . . . , 2016—ieeexplore.ieee.org (Year: 2016).* https://en.wikipedia.org/wiki/Null_hypothesis , retrieved from the web Nov. 21, 2020 (Year: 2020).* https://en.wikipedia.org/wiki/Simpson%27s_paradox , retrieved from the web Nov. 21, 2020 (Year: 2020).*

Data scientists in software teams: State of the art and challenges M Kim, T Zimmermann, R DeLine . . . —IEEE Transactions on . . . , 2017—ieeexplore.ieee.org (Year: 2017).*

Statistics for Dummies Cheat Sheet, From Statistics For Dummies, 2nd Edition, retrieved from web.archive.org's webpage of Nov. 20, 2016 (Year: 2016).*

What is signal processing?[President's Message] J Moura—IEEE Signal Processing Magazine, 2009—ieeexplore.ieee.org (Year: 2009).*

"Soil sampling" RL Mahler, TA Tindall—1994—idahopar.org (Year: 1994).*

Ledolter, et al., Using a Fractional Factorial Design to Increase Direct Mail Response at Mother Jones Magazine, 18 Quality Engineering 4 (2006) (Year: 2006).*

* cited by examiner

METHOD AND SYSTEM FOR AUTOMATIC DETECTION AND PREVENTION OF QUALITY ISSUES IN ONLINE EXPERIMENTS

BACKGROUND

1. Technical Field

The present teaching relates to methods, systems, and programming for Internet services. Particularly, the present teaching is directed to methods, systems, and programming for automatic detection and prevention of quality issues in online experiments.

2. Discussion of Technical Background

The Internet provides opportunities for many companies to rapidly evaluate and prioritize ideas using "online controlled experiments" also known as online experiments, bucket testing or "AB testing." Online experiments can not only be used for understanding causal mechanisms involved in user behaviors, but also help a company in making product decisions based on key metrics such as revenue and click-through rate. A critical challenge in running large scale experiments is how to ensure good quality of experimentation samples, or quality of buckets.

Traditionally, statisticians have applied various techniques to determine biases/issues with their buckets. This is a very time consuming step with high potential of human errors, which makes the process largely un-scalable. In addition, the cost of making incorrect decisions can range from minor bad product decisions to catastrophic revenue impact to a company or entity. Accordingly, classical testing and debugging techniques do not apply when there are billions of live variants of the site.

Therefore, there is a need to provide an improved solution for managing online experiments to solve the above-mentioned problems.

SUMMARY

The present teaching relates to methods, systems, and programming for Internet services. Particularly, the present teaching is directed to methods, systems, and programming for automatic detection and prevention of quality issues in online experiments.

In one example, a method, implemented on a machine having at least one processor, storage, and a communication platform capable of connecting to a network for managing online experiments is disclosed. A plurality of experiment layers is created with respect to a plurality of online users. Each experiment layer includes at least one experiment each of which includes one or more buckets associated with respective features to be experimented on. Each of the plurality of online users is assigned to a corresponding bucket in each experiment layer, such that the user is simultaneously associated with multiple experiments in different layers. User event data related to the plurality of experiment layers are collected from the plurality of online users. One or more contaminated buckets are automatically detected based on the user event data.

In a different example, a system having at least one processor, storage, and a communication platform capable of connecting to a network for managing online experiments is disclosed. The system includes: a multi-layer experiments creator configured for creating a plurality of experiment layers with respect to a plurality of online users, wherein each experiment layer includes at least one experiment each of which includes one or more buckets associated with respective features to be experimented on; a user assigner configured for assigning each of the plurality of online users to a corresponding bucket in each experiment layer, such that the user is simultaneously associated with multiple experiments in different layers; a grid based event analyzer configured for collecting user event data related to the plurality of experiment layers from the plurality of online users; and an experiment contamination detector configured for automatically detecting one or more contaminated buckets based on the user event data.

Other concepts relate to software for implementing the present teaching of automatic detection and prevention of quality issues in online experiments. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for managing online experiments is disclosed. The information, when read by the machine, causes the machine to perform the following: creating a plurality of experiment layers with respect to a plurality of online users, wherein each experiment layer includes at least one experiment each of which includes one or more buckets associated with respective features to be experimented on; assigning each of the plurality of online users to a corresponding bucket in each experiment layer, such that the user is simultaneously associated with multiple experiments in different layers; collecting user event data related to the plurality of experiment layers from the plurality of online users; and automatically detecting one or more contaminated buckets based on the user event data.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
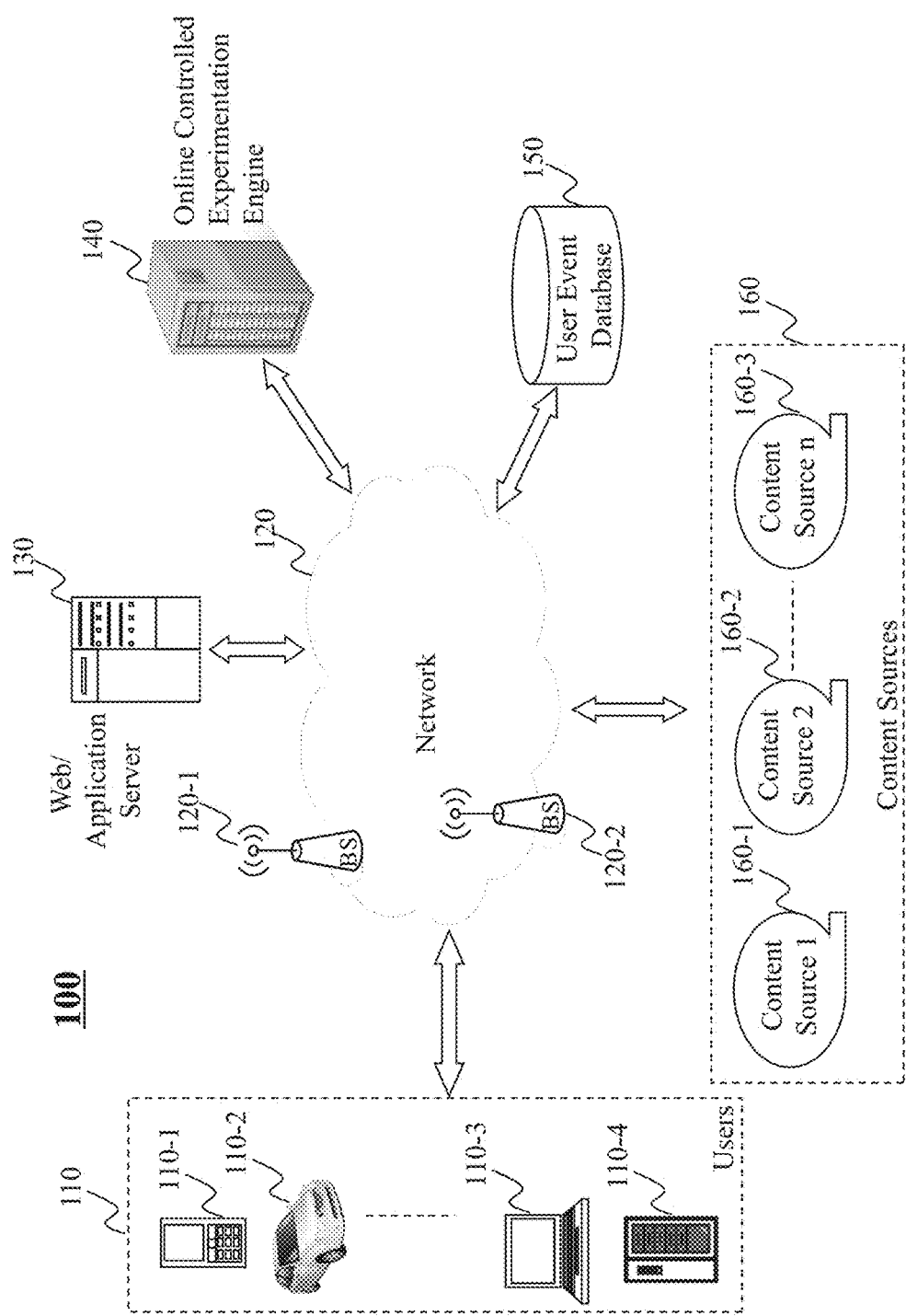
FIG. 1A is a high level depiction of an exemplary networked environment for managing online experiments, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficiently and effectively managing online experiments. The method and system as disclosed herein aim at ensuring quality of online experiments by automatic detection and prevention of quality issues in the online experiments.

Today, many large sites, including Yahoo!, Amazon, Bing, Facebook, Google, and LinkedIn, run thousands to tens of thousands of experiments each month for testing user interface (UI) changes, enhancements to algorithms (search, ads, personalization, recommendation, etc.), changes to apps, content management system, etc. Online controlled experiments are now considered an indispensable tool, where their use is also growing for startups and smaller websites. Controlled experiments are especially useful in combination with agile software development methodology, where features can be rapidly rolled out and validated at the same time.

Many online experiments are run at scale, with a highly sophisticated experimentation platform, catering to larger number of dimensions such as location, browsers, devices, experience and many more to running thousands of multivariate experiments concurrently in a multilayered platform. Each experiment typically exposes several millions of users to a treatment, over several experiments that are running concurrently. For example, at Yahoo!, a user can have an experience in Yahoo sports and a different experience in Yahoo finance. This is possible in a multiple layered experimentation platform where a user can get hashed into different buckets in different layers, thereby enabling the system to run several experiments concurrently.

In a multi-layering experimentation platform, each layer may be represented by a unique seed value. In a given layer a user or an experiment unit always get hashed to the same hash value. In a different layer with a different seed, the same user gets hashed to a different hash value. Without contamination or other issues, a layer in theory has users uniformly distributed across all hash values. This process of hashing users largely depends on the quality and efficiency of randomization algorithm and the seed used for hashing. However, in practice, the traffic distribution can be non-uniform due to various reasons such as incorrect experiment setup, negative experiments, instrumentation issues, and application of wrong experiment filters, contaminating the entire layer. Unnoticed layer contamination can have serious impact on revenue, user engagement, and user retention. Thus it is important to monitor, detect and fix bad segments of a layer in early stages of experimentation.

The present teaching discloses a framework using novel statistical tests that automatically detect and fix problematic experiments that not only impact the quality of the testing but also the product. The framework may be designed for detecting issues, e.g. biases and imbalances in an experiment layer, experiment, data or instrumentation, and correcting them at early stages of detection. Detecting and fixing quality issues can lead to better and faster product decisions through experimentation giving the product owners a competitive edge over peers. This work of automatically ensuring quality at scale is a novel industry leading effort, which has not been explored in the rapid growing online A/B testing community.

The present teaching discloses a method and framework for precisely quantifying severity of contamination of a given experiment. For each active experiment layer on a given date, this framework may perform two-stage statistical tests to determine the health of an experiment layer. This includes a uniformity test at the layer level to reveal problematic layers and a proportion test at individual hash value level to identify problematic hash values in each problematic layer. In one embodiment, the framework may use these bad hashes to identify problematic free space, experiments, and/or buckets in that layer.

The disclosed system may automatically ensure that future experiments are insulated from detected contaminants, by performing some prevention actions. Based on the above detection process, the system can automatically calculate the severity levels for the contaminated layers. The system may then put the experiments on hold or reseeds the layer for most severe issues, and send email/alerts to the owner of the experiment for less severe issues. For example, the system can provide the following options for prevention: (1) the experiment owner can set up a threshold based on which the system can deallocate those bad segments; (2) the system may provide an option to handle bad segments by removing bad segments from the system and reinstating bucket size after the removal of bad segments; (3) the system can flag these bad segments as blackout segments in the data collection phase and skip them during data processing.

The above actions can prevent the impact of a bad bucket or experiment on the rest of the experiments in that layer. In practice, this framework can help a user to identify and fix major issues related to instrumentation, traffic splitting, bucket stamping, experiment unit loss, etc.

The terms "layer" and "experiment layer" may be used interchangeably herein. The terms "online controlled experiments" and "online experiments" may be used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1A is a high level depiction of an exemplary networked environment 100 for managing online experiments, according to an embodiment of the present teaching. In FIG. 1A, the exemplary networked environment 100 includes one or more users 110, a network 120, a web/application server 130, an online controlled experimentation engine 140, a user event database 150, and content sources 160. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof. The network 120 may also include various network access points, e.g., wired or wireless access points such as base stations or Internet exchange points 120-1 . . . 120-2, through which a data source may connect to the network 120 in order to transmit information via the network 120.

Users 110 may be of different types such as users connected to the network 120 via desktop computers 110-4, laptop computers 110-3, a built-in device in a motor vehicle 110-2, or a mobile device 110-1. In one embodiment, users 110 may be connected to the network 120 and able to interact with the web/application server 130 and the online controlled experimentation engine 140 through wired or wireless technologies and related operating systems implemented within user-wearable devices (e.g., glasses, wrist watch, etc.).

A user, e.g., the user 110-1, may send requests to the web/application server 130 via the network 120 and receive content from the web/application server 130, e.g. by accessing a web page hosted by the web/application server 130 or using an application supported by the web/application server 130. In general, the user may receive various online services from the web/application server 130 and provide user feedbacks to the web/application server 130.

The web/application server 130 may provide to the users 110 some online services like web portal, online search, news app etc. In some embodiment, the web/application server 130 may also provide support or update to some applications installed on a local device of a user. The web/application server 130 may collect user activities related to the online services or applications. The user activities may include various user events from the users as requests or feedbacks to the user event database 150.

In one embodiment, the user event database 150 may store data related to the user events into the user event database 150. In general, the information in the user event database 150 may be generated by one or more different applications (not shown), which may be running on the web/application server 130, at the backend of the web/application server 130, or as a completely standalone system capable of connecting to the network 120, accessing information from different sources, analyzing the information, generating structured information, and storing such generated information in the user event database 150.

The online controlled experimentation engine 140 may manage online experiments through the web/application server 130, for testing UI changes, enhancements to algorithms (search, ads, personalization, recommendation, etc.), changes to apps, content management system, etc. The online controlled experimentation engine 140 can provide new features to be tested to the web/application server 130 and obtain user feedbacks to the new features and some controlled features. The web/application server 130 may obtain the user feedbacks either by accessing information stored in the user event database 150 via the network 120 or by receiving information from the web/application server 130 directly. Based on the user feedbacks, the online controlled experimentation engine 140 may detect one or more problematic layers. The problematic layers have quality issues that can cause results of the corresponding experiments to be biased. In addition, the online controlled experimentation engine 140 may identify one or more bad segments or buckets in each problematic layer that contribute to the quality issue of that layer. The online controlled experimentation engine 140 may perform some prevention actions accordingly to ensure that the corresponding experiments are cleaned and fixed, and/or the future experiments are insulated from the detected bad segments.

The content sources 160 in the exemplary networked environment 100 include multiple content sources 160-1, 160-2 . . . 160-3. A content source 160 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The web/application server 130 may access information from any of the content sources 160-1, 160-2 . . . 160-3. For example, the web/application server 130 may fetch content, e.g., websites, through its web crawler from the content sources 160 and provide to the users 110.

Figure 1B:
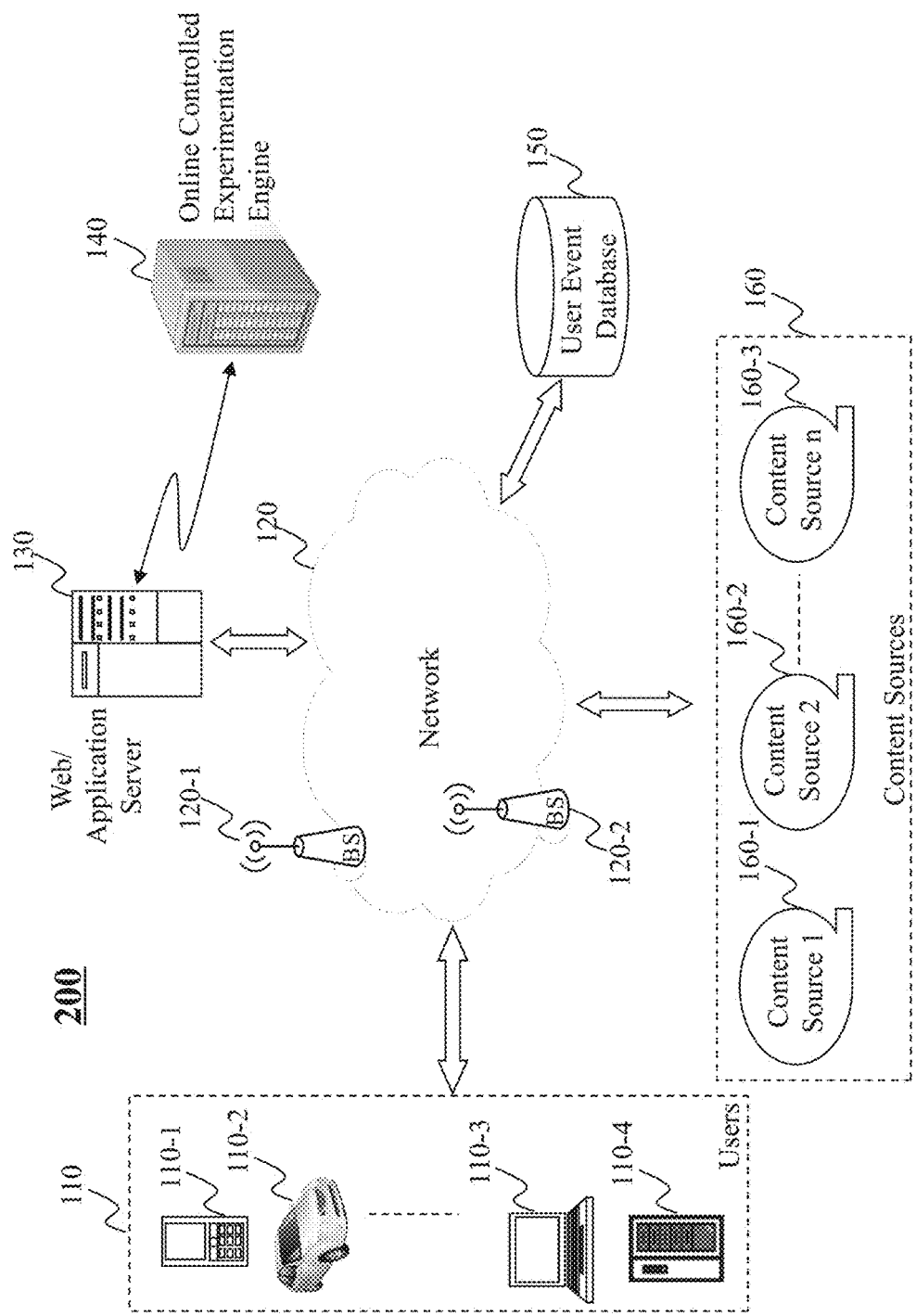
FIG. 1B is a high level depiction of another exemplary networked environment for managing online experiments, according to an embodiment of the present teaching.

FIG. 1B is a high level depiction of another exemplary networked environment 200 for managing online experiments, according to an embodiment of the present teaching. The exemplary networked environment 200 in this embodiment is similar to the exemplary networked environment 100 in FIG. 1A, except that the online controlled experimentation engine 140 serves as a backend system for the web/application server 130.

Figure 2:
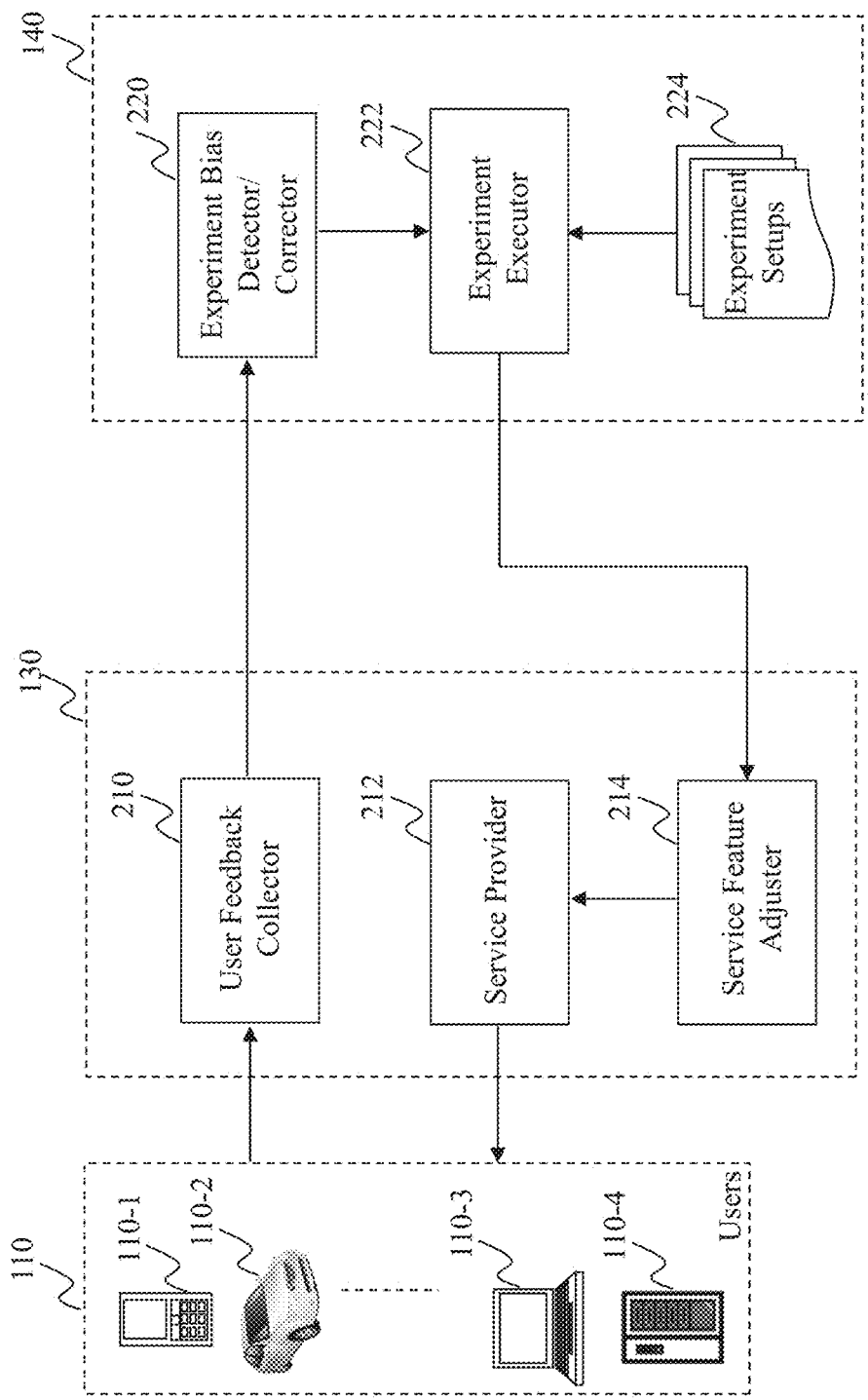
FIG. 2 provides exemplary diagrams for managing online experiments, according to an embodiment of the present teaching.

FIG. 2 provides exemplary diagrams for managing online experiments, according to an embodiment of the present teaching. As shown in FIG. 2, the web/application server 130 may communicate with the users 110 to provide web or app services to the users 110. In this example, the web/application server 130 may include a user feedback collector 210, a service provider 212, and a service feature adjuster 214; while the online controlled experimentation engine 140 may include an experiment bias detector/corrector 220, an experiment executor 222, and experiment setups 224.

The service provider 212 in this example may provide web or app services to the users 110, e.g. by providing web portal or online searching services. During online experiments, the service provider 212 may provide services according to different features to be tested. The tested features may include one of UI changes, enhancements to algorithms (search, ads, personalization, recommendation, etc.), changes to apps, content management system, etc. For example, the service feature adjuster 214 may create or adjust a feature to be presented by the service provider 212 and tested according to user events from the users 110 upon receiving or accessing content with this feature and/or a controlled feature for comparison.

The service feature adjuster 214 in this example may adjust a feature to be tested based on instructions from the experiment executor 222. The experiment executor 222 can execute online experiments based on experiment setups 224 which may be determined by an administrator or owner of the experiments. As discussed above, the experiment executor 222 may execute the experiments in a multi-layer platform. For example, at Yahoo!, the administrator can do online experiments in Yahoo sports and in Yahoo finance concurrently, when a same user can experience different features in the two services when accessing the website of Yahoo!.

The user feedback collector 210 in this example may collect user feedback or user events from the users 110, in connection with the provided services and tested features. For example, user feedbacks like click through rate, conversion rate, and dwelling time can be collected by the user feedback collector 210. The user feedback collector 210 may either store the collected information to the user event database 150 or to the experiment bias detector/corrector 220 directly.

The experiment bias detector/corrector 220 in this example can detect biases and contamination of the online experiments and correct them. Based on the user feedback data, the experiment bias detector/corrector 220 may detect quality issues. In one example, the quality issue may be caused by incorrect experiment setup, e.g. when one experiment can impact other concurrently running experiments. In another example, the quality issue may be caused when a page was designed in such a way that it does not allow users to even access it or view it. In yet another example, the quality issue may be caused by server failures, when multiple servers in a distributed system are serving the web page and one particular server comes down, such that then the users following that particular server will not be able to see the web page. The experiment bias detector/corrector 220 can perform prevention actions on the detected quality issues to protect the experiments executed by the experiment executor 222.

Figure 3:
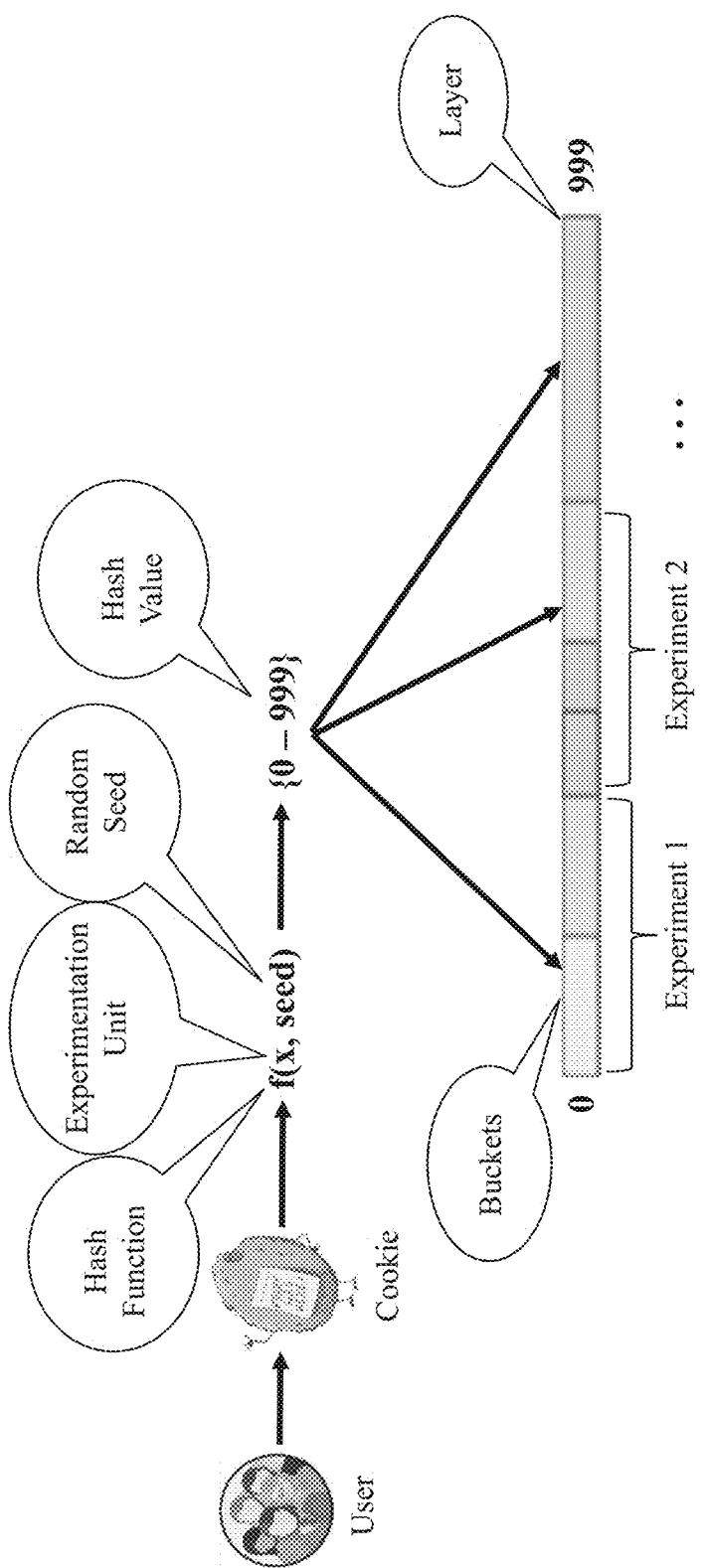
FIG. 3 depicts an exemplary process for bucket assignment in managing online experiments, according to an embodiment of the present teaching.

FIG. 3 depicts an exemplary process for bucket assignment in managing online experiments, according to an embodiment of the present teaching. Bucket assignment involves a process of randomly splitting traffic between variants or informally between buckets. This may be done on the website embedded with a randomization algorithm on its load balancer or proxy server. For example, in Yahoo!, the experimentation platform supports both multilayer and multivariate experiments.

In a typical experimental setup, user is a most commonly used experiment unit, although some experiments may use sessions, page views or ad units. This setup takes in user units, e.g. user id, or browser cookie and randomly assigns the user units to the variants or informally called the buckets of an experiment. This is also known as bucket assignment in an online experiment.

As shown in FIG. 3, on each experiment layer, the user unit ID (experimentation unit x) is hashed through a hash function with a layer specific random seed. The hash function is expected to hash user units randomly and uniformly over the hash ranges. In other words, every hash value in that layer has equal probability of getting user units assigned. After the hashing stage, each user unit is assigned a hash value in that layer. This is followed by the bucket assignment stage, where a range of hash values are assigned to a bucket based on the bucket size, and internally users falling on the respective hash ranges are assigned to the bucket. For example, suppose a layer supports 1000 hash segments and if a 1% bucket is created in that layer, then about 10 hash values would get assigned randomly to that bucket, the user falling in those respective hash values get assigned to the bucket. After the users are assigned to a bucket, various metrics associated with those users are collected, followed by running statistical tests on the collected metrics to measure difference between the two variants, depending on which the feature is either retained or rejected. The various metrics of interest may include unique-user-counts, page views, number of sessions, click through rate etc.

Figure 4:
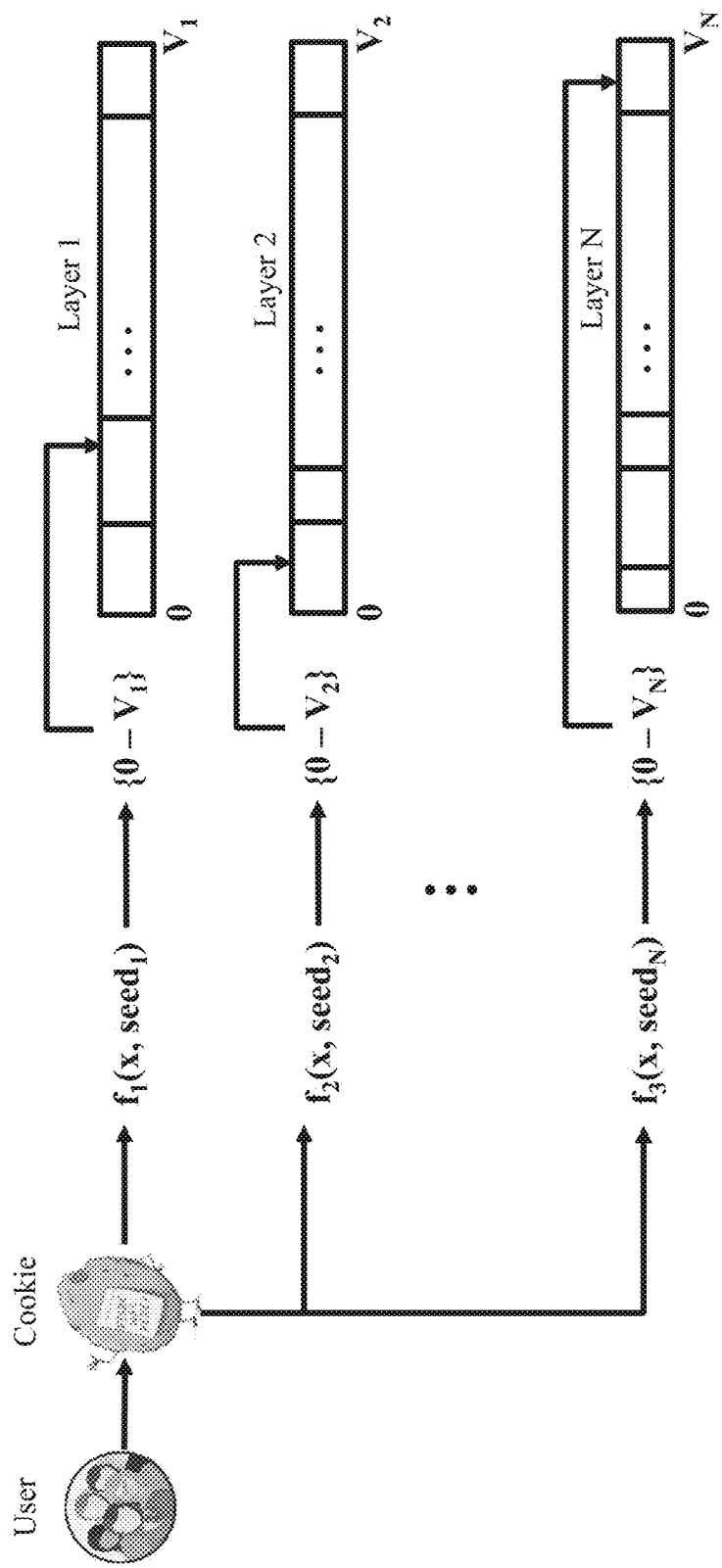
FIG. 4 depicts another exemplary process for bucket assignment in managing online experiments, according to an embodiment of the present teaching, in a multilayered platform.

FIG. 4 depicts another exemplary process for bucket assignment in managing online experiments, according to an embodiment of the present teaching, in a multilayered platform. As shown in FIG. 4, there are N layers of online experiments running concurrently, where each layer is associated with a hash function f and a layer specific random seed. For a given experimentation unit x, e.g. obtained based on a cookie of a user, the hash function in different layers can hash the experimentation unit x into different hash values. As such, the same experimentation unit x may be assigned to different buckets in different layers, based on the different hash values falling on the respective hash ranges of the buckets. Therefore, a same user corresponding to the experimentation unit x can experience different tested features in different online experiments at different layers.

In one embodiment, as shown in FIG. 4, different layers are associated with different hash functions. In another embodiment, the different layers may be associated with a same hash function but with different random seeds.

Figure 5:
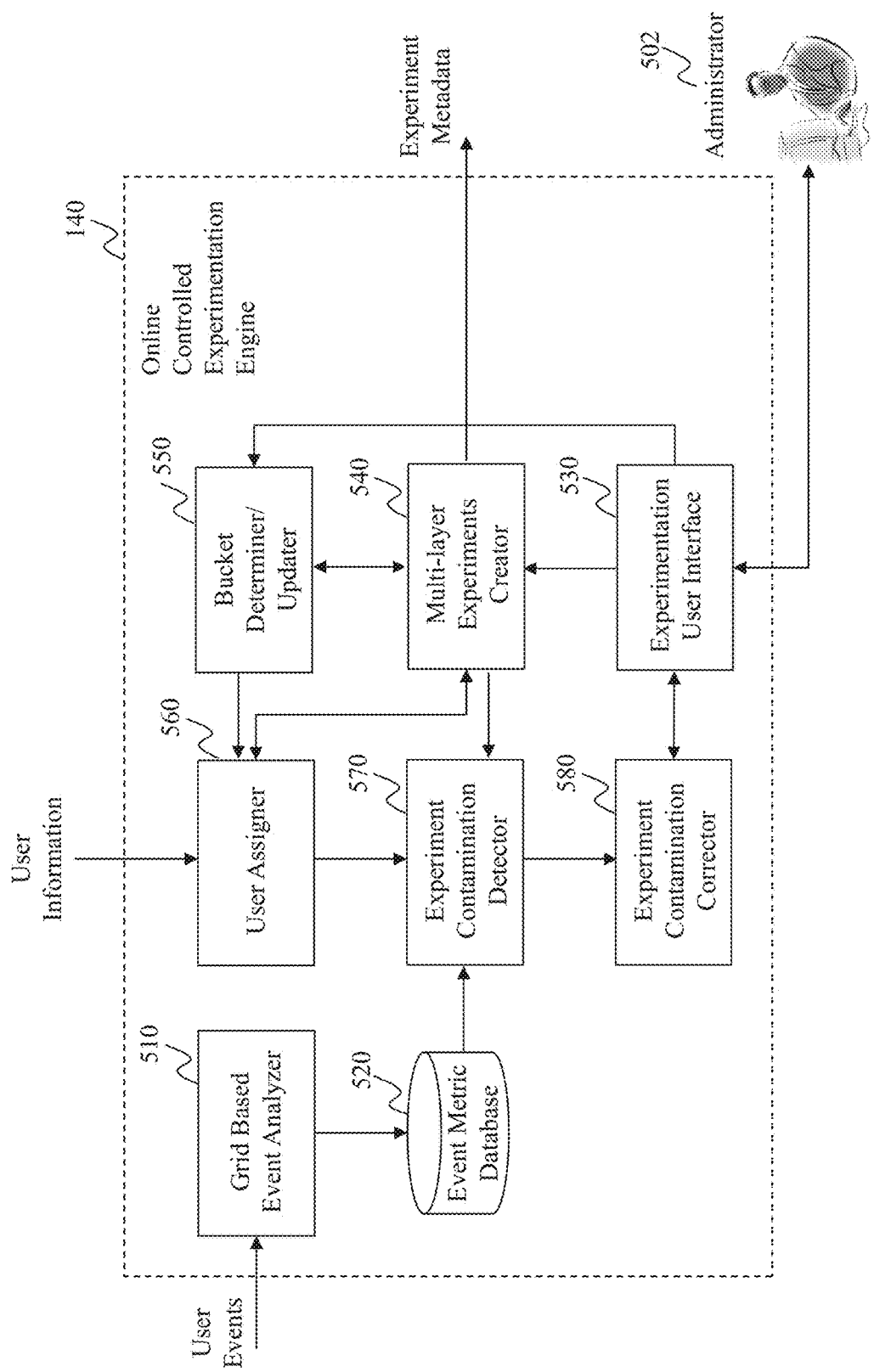
FIG. 5 illustrates an exemplary diagram of an online controlled experimentation engine, according to an embodiment of the present teaching.

FIG. 5 illustrates an exemplary diagram of an online controlled experimentation engine 140, according to an embodiment of the present teaching. The online controlled experimentation engine 140 in this example includes a grid based event analyzer 510, an event metric database 520, an experimentation user interface 530, a multi-layer experiments creator 540, a bucket determiner/updater 550, a user assigner 560, an experiment contamination detector 570, and an experiment contamination corrector 580.

The grid based event analyzer 510 in this example may obtain user events about online activities of the users, either from the user event database 150 or directly from the web/application server 130. The grid based event analyzer 510 may analyze the user events based on a grid system or other distributed systems to generate some event metric data that can characterize quality of the online experiments. The grid based event analyzer 510 can store the event metric data into the event metric database 520.

The experimentation user interface 530 in this example may obtain a request for creating or updating one or more online experiments. The request may come from an administrator 502 or an owner of the experiments. In one embodiment, the request may include information about metadata and setups of the experiments.

The multi-layer experiments creator 540 in this example may create or update an online experiment based on the request received via the experimentation user interface 530. As discussed above, the multi-layer experiments creator 540 may create the experiments in multiple layers, each of which may include one or more online experiments. The multi-layer experiments creator 540 may provide the multi-layer experiment metadata to the bucket determiner/updater 550 for determining or updating one or more buckets for each experiment. The multi-layer experiments creator 540 may also provide the multi-layer experiment metadata to the user assigner 560 for assigning online users to different buckets in each experiment. In one embodiment, the multi-layer experiments creator 540 may also provide the multi-layer experiment metadata to the web/application server 130 which may include a metadata synchronization client that can store the metadata locally at the web/application server 130 to minimize delay in processing requests from the users.

The bucket determiner/updater 550 in this example may receive the experiment metadata from the multi-layer experiments creator 540 and/or the request from the experimentation user interface 530. The bucket determiner/updater 550 can create or update a bucket for an experiment based on new metadata or new setup. The bucket determiner/updater 550 may send the bucket information to the multi-layer experiments creator 540 to be included as part of the experiment metadata. The bucket determiner/updater 550 may also send the bucket information to the user assigner 560 for user/bucket assignment.

The user assigner 560 in this example may assign online users to different buckets in different experiments at different layers. This assignment is based on user information (e.g. user ID or cookie information) of the online users, and based on the experiment metadata including bucket information. The user assigner 560 may send the user/bucket assignment results to the multi-layer experiments creator 540 to be included as part of the experiment metadata, and to the experiment contamination detector 570 for detecting experiment contamination.

The experiment contamination detector 570 in this example may obtain event metric data from the event metric database 520 and automatically detect contamination or other quality issues of the online experiments, by performing one or more statistical tests. The experiment contamination detector 570 can not only determine which layer has problems, but also identify which segment or bucket in that layer causes the problem and how severe the problem is. The experiment contamination detector 570 may send these detection results to the experiment contamination corrector 580 for contamination correction.

The experiment contamination corrector 580 in this example may correct the detected contaminations of the experiment data, e.g. by performing one or more prevention actions. In one situation, the experiment contamination corrector 580 may isolate the contaminated bucket and send the administrator 502 a prevention report via the experimentation user interface 530, e.g. when the severity level of the contamination is higher than a threshold. In another situation, the experiment contamination corrector 580 may just send the administrator 502 an email alert about this contamination via the experimentation user interface 530, e.g. when the severity level of the contamination is not higher than the threshold.

Figure 6:
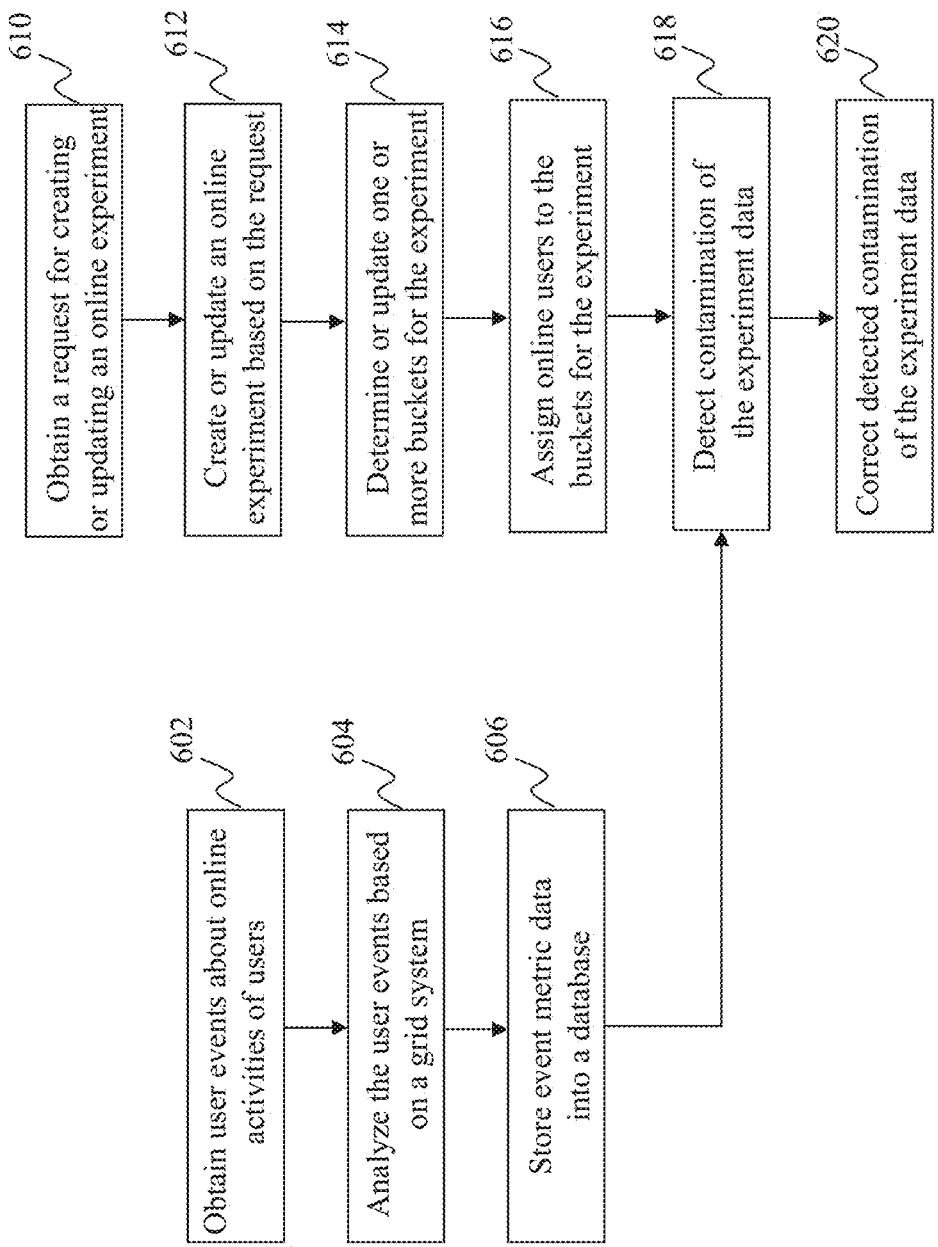
FIG. 6 is a flowchart of an exemplary process performed by an online controlled experimentation engine, according to an embodiment of the present teaching.

FIG. 6 is a flowchart of an exemplary process performed by an online controlled experimentation engine, e.g. the online controlled experimentation engine 140 in FIG. 5, according to an embodiment of the present teaching. User events about online activities of users are obtained at 602. The user events are analyzed at 604 based on a grid system. Event metric data are stored at 606 into a database. The process may then move to 618.

At 610, a request is obtained for creating or updating an online experiment. At 612, an online experiment is created or updated based on the request. One or more buckets are determined or updated 614 for the experiment. Online users are assigned 616 to the buckets for the experiment. Then the process may move to 618.

Contamination or other quality issues of the experiment data may be detected at 618. The detected contamination may be corrected at 620, e.g. based on prevention actions.

Figure 7:
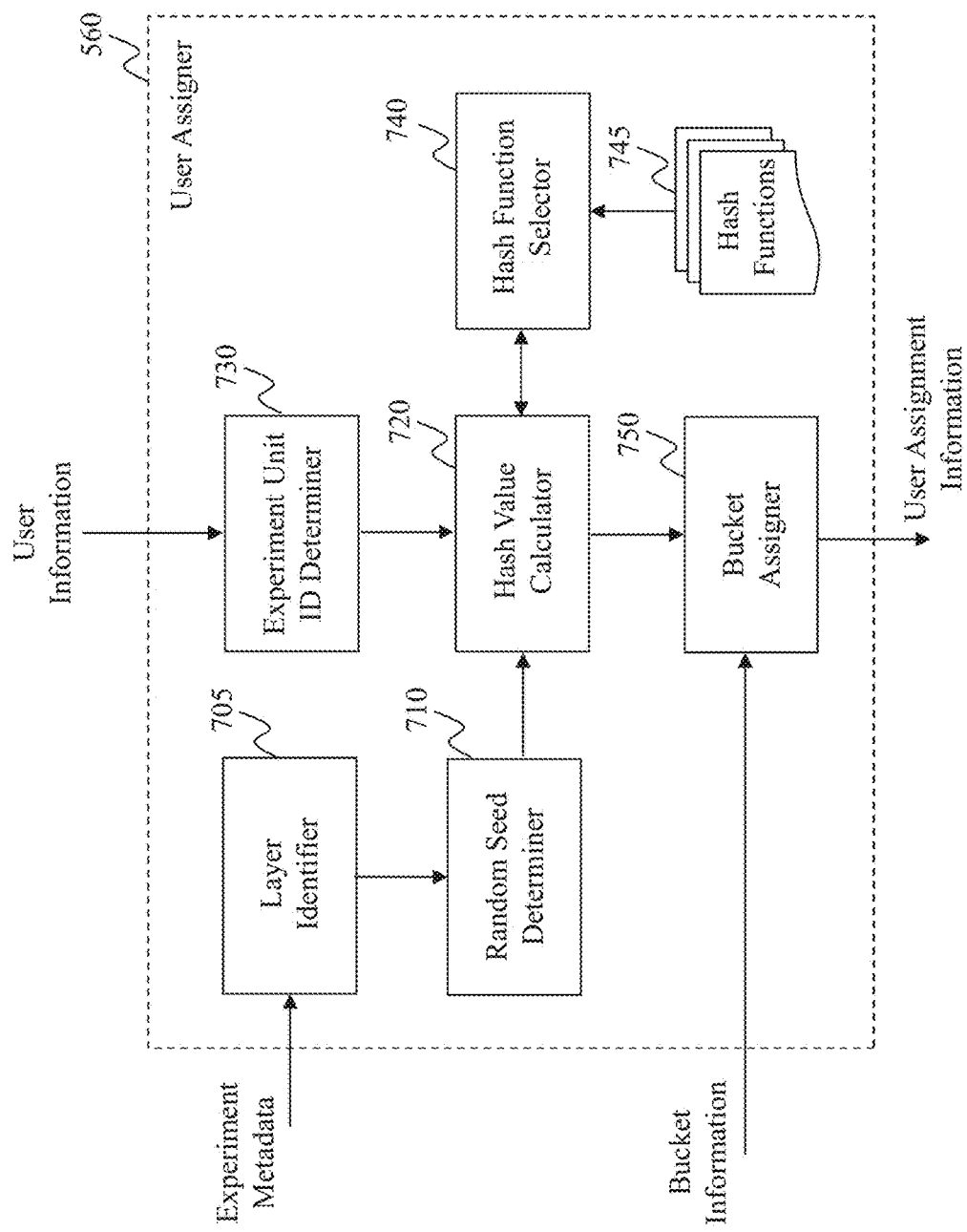
FIG. 7 illustrates an exemplary diagram of a user assigner, according to an embodiment of the present teaching.

FIG. 7 illustrates an exemplary diagram of a user assigner 560, according to an embodiment of the present teaching. As shown in FIG. 7, the user assigner 560 in this example includes a layer identifier 705, a random seed determiner 710, a hash value calculator 720, an experiment unit ID determiner 730, a hash function selector 740, stored hash functions 745, and a bucket assigner 750.

The layer identifier 705 in this example may receive experiment metadata for user assignment. This experiment metadata may come from the multi-layer experiments creator 540 and/or the bucket determiner/updater 550. Based on the experiment metadata, the layer identifier 705 may determine one or more layers of the online experiments. For example, there may be multiple experiment layers running experiments at the same time. The layer identifier 705 may send the layer information to the random seed determiner 710 for determining random seeds.

The random seed determiner 710 in this example may receive layer information from the layer identifier 705 and determine a random seed for each layer identified by the layer identifier 705. The random seed determiner 710 may send the random seed to the hash value calculator 720 for calculating hash values based on different random seeds.

The experiment unit ID determiner 730 in this example may obtain user information from the online users and determine an experiment unit ID for each online user. As discussed above, the experiment unit ID may be generated for distinguishing the users, based on e.g. user ID, browser cookie, or a randomly assigned unit. The experiment unit ID determiner 730 can send the experiment unit IDs to the hash value calculator 720 for calculating hash values for different users.

The hash function selector 740 in this example may select a hash function for user assignment. The hash function selector 740 may select one of the stored hash functions 745, upon receiving an instruction from the hash value calculator 720. The hash function selector 740 may provide the selected hash function to the hash value calculator 720 for calculating hash values based on the selected hash function.

The hash value calculator 720 in this example may receive the selected hash function from the hash function selector 740, the random seeds for different experiment layers from the random seed determiner 710, and experiment unit IDs associated with different online users from the experiment unit ID determiner 730. For each experiment unit ID and each experiment layer, the hash value calculator 720 may calculate a hash value based on the selected hash function and the random seed associated with the layer, where the hash function can hash the experiment unit ID to a hash value based on the random seed. Thus, a same user will be hashed to different hash values in different layers; while different users in a same layer will also be hashed to different hash values. The hash value calculator 720 may send the calculated hash values to the bucket assigner 750 for bucket assignment.

The bucket assigner 750 in this example may obtain the calculated hash values from the hash value calculator 720 and obtain the bucket information from the bucket determiner/updater 550. The bucket assigner 750 may then assign each user to a bucket in each layer based on a corresponding calculated hash value. As shown in FIGS. 3 and 4, because different buckets cover different hash value ranges in a layer, the bucket assigner 750 can assign a user to a bucket when the hash value calculated for the user in the layer falls within the hash value range of the bucket. The bucket assigner 750 may send the user assignment information for metric data collection and/or for contamination detection.

Figure 8:
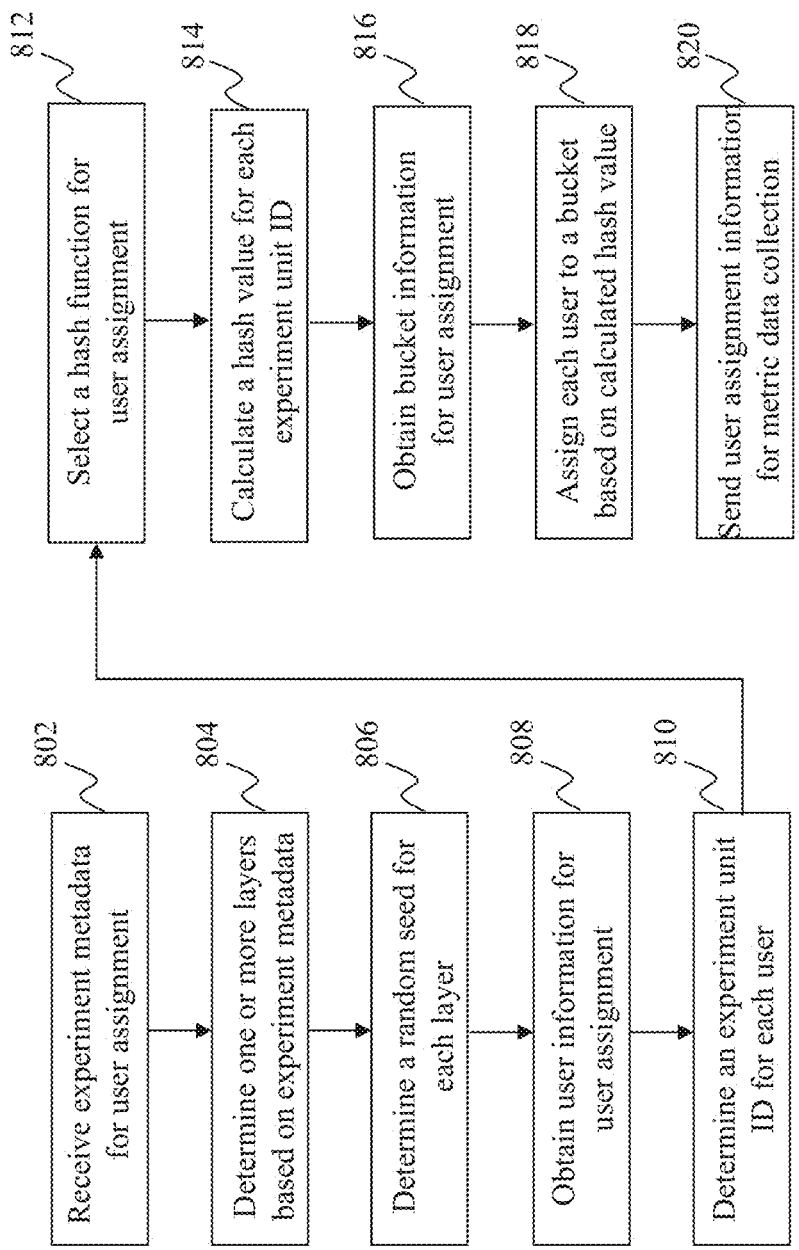
FIG. 8 is a flowchart of an exemplary process performed by a user assigner, according to an embodiment of the present teaching.

FIG. 8 is a flowchart of an exemplary process performed by a user assigner, e.g. the user assigner 560 in FIG. 7, according to an embodiment of the present teaching. Experiment metadata are received at 802 for user assignment. One or more layers are determined at 804 based on experiment metadata. A random seed is determined at 806 for each layer. User information of online users is obtained at 808 for user assignment. An experiment unit ID is determined at 810 for each user.

A hash function is selected at 812 for user assignment. A hash value is calculated at 814 for each experiment unit ID. Bucket information is obtained at 816 for user assignment. Each user is assigned at 818 to a bucket in each layer, based on a corresponding calculated hash value. At 820, the user assignment information is sent for metric data collection and/or contamination detection.

Figure 9:
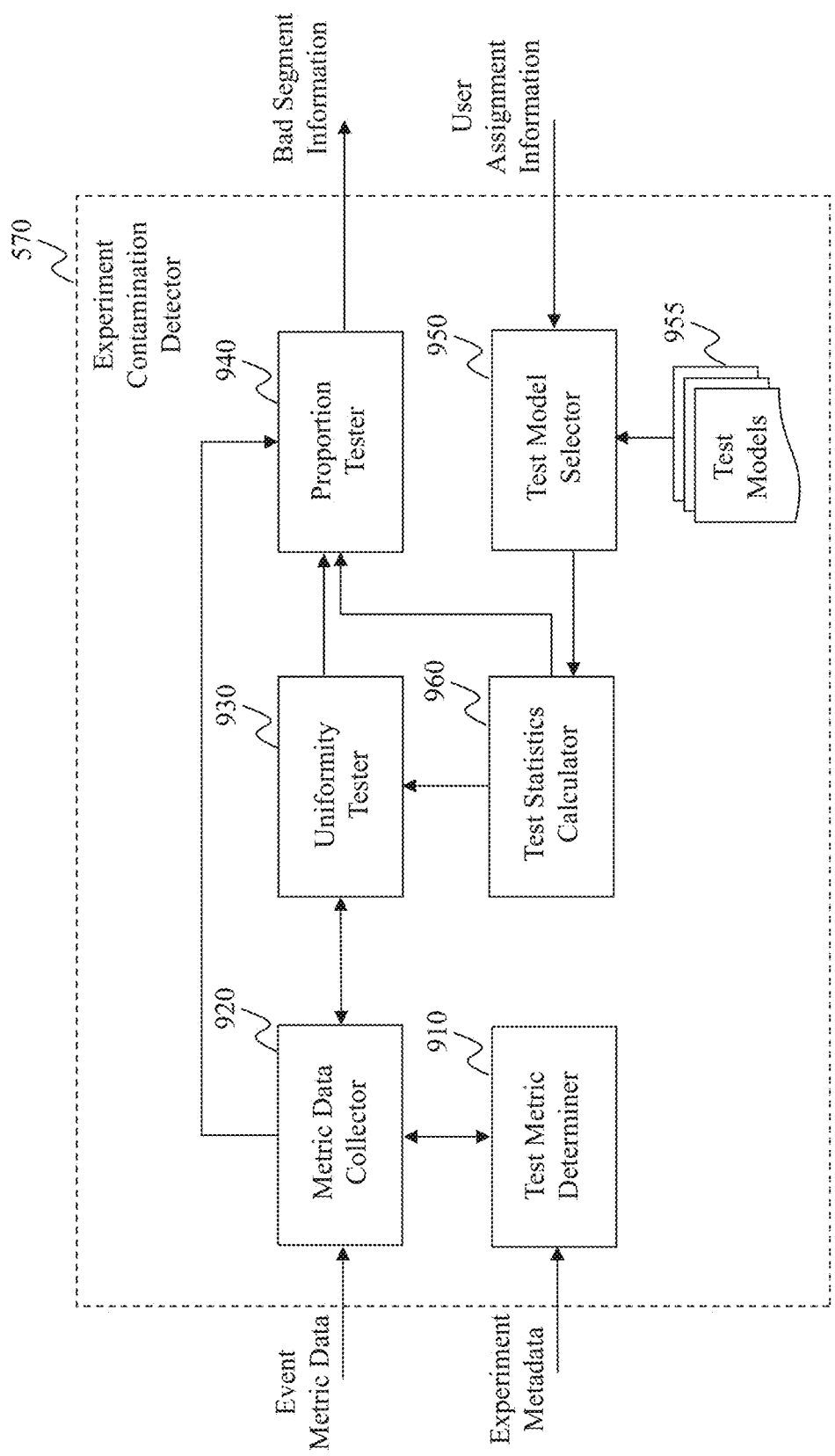
FIG. 9 illustrates an exemplary diagram of an experiment contamination detector, according to an embodiment of the present teaching.

FIG. 9 illustrates an exemplary diagram of an experiment contamination detector 570, according to an embodiment of the present teaching. As shown in FIG. 9, the experiment contamination detector 570 in this example includes a test metric determiner 910, a metric data collector 920, a uniformity tester 930, a proportion tester 940, a test model selector 950, stored test models 955, and a test statistics calculator 960.

The test metric determiner 910 in this example may obtain experiment metadata for contamination detection. Based on the experiment metadata, the test metric determiner 910 may determine one or more test metrics for data collection. For example, the experiment metadata may include instructions from the administrator 502 to collect various metrics of interest, including unique-user-counts, page views, number of sessions, click through rate etc. The test metric determiner 910 may send the test metrics to the metric data collector 920 for collecting metric data. In one embodiment, the test metric determiner 910 may determine the test metrics upon request from the metric data collector 920.

The metric data collector 920 in this example may receive the determined test metrics from the test metric determiner 910 and collect metric data about user events based on the determined test metrics. The metric data collector 920 may send the collected metric data to the uniformity tester 930 for performing a uniformity test to detect problematic layers and to the proportion tester 940 for performing a proportion test to identify problematic hash ranges for each problematic layer.

In general, detection of a bad layer plays a vital role in identifying wide range of issues ranging from data quality issues to instrumentation issues. For each active experiment layer on a given date, the disclosed system may perform two-stage statistical tests to determine the health of the experiment layer. The uniformity test at layer level can reveal problematic layers while the proportion test can identify problematic hash values followed by Bonferroni correction to remove false positive.

In one embodiment, the uniform distribution test at layer level may be performed using Pearson's Chi-Square test. For example, the following null and alternative hypotheses can be evaluated:

H0: the traffic distribution by the hash value range is uniform;

H1: the traffic distribution is NOT uniform.

The inputs to the Chi-Square test are the user unit counts assigned to each hash segment of a given layer: ($x_0, x_1 \ldots x_{H-1}$), here H represents the total number of hash values and the sum of these user counts represents the total user population of the layer:

$$N = \sum_{i=0}^{H-1} x_i$$

The value of the Chi-Square test statistic is:

$$\chi^2 = NH \sum_{i=0}^{H-1} \left(\frac{x_i}{N} - \frac{1}{H}\right)^2.$$

Figure 13:
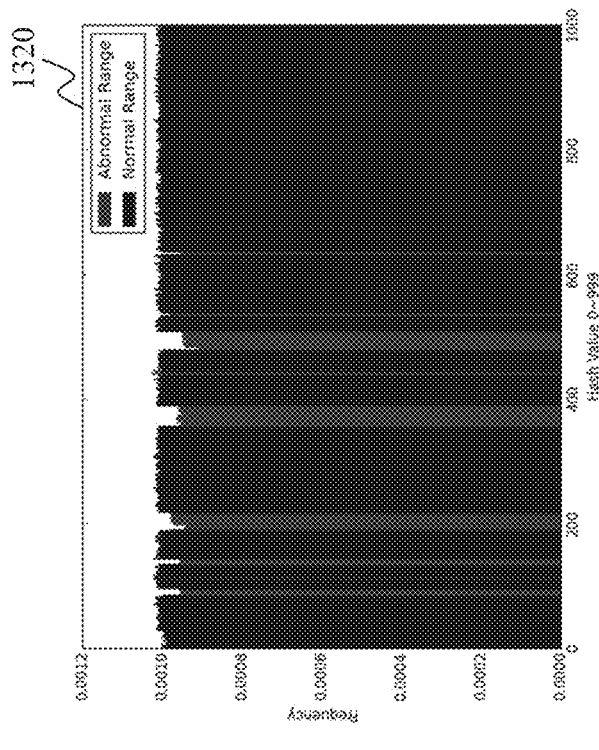
FIG. 13 illustrates examples of uniform and contaminated experiment layers, according to an embodiment of the present teaching.
Figure 13:
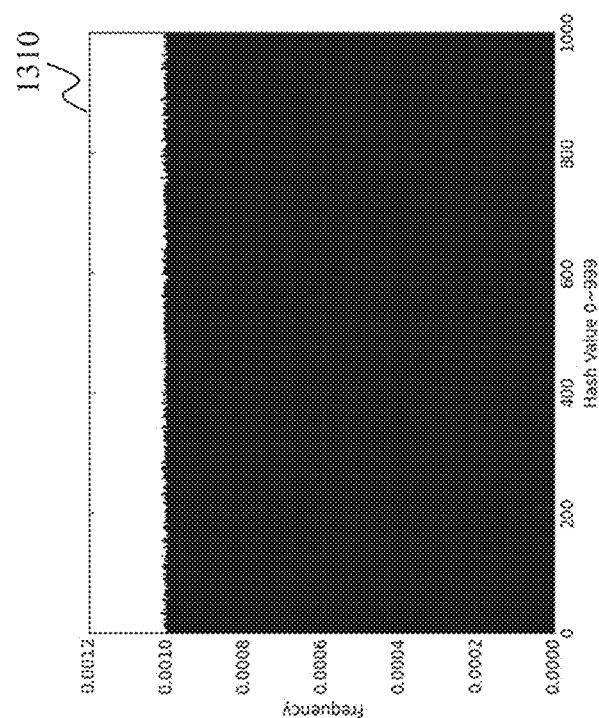

Under H0, $\chi^2$ follows a chi-square distribution with degree of freedom H−1. If the p-value of the uniform test is below the given significance level of $\alpha$ (e.g. 0.05), then the H0 is rejected, meaning the layer fails to pass the uniform test; otherwise if p-value>$\alpha$, the layer passes the uniform test with H0 accepted and H1 rejected. FIG. 13 illustrates examples of uniform and contaminated experiment layers, according to an embodiment of the present teaching. To be specific, FIG. 13 demonstrates a traffic distribution 1310 of a uniform layer and a traffic distribution 1320 of a contaminated layer.

The proportion test may be performed on those layers that have failed the uniformity test, to identify bad hash ranges of each of those layers. The proportion test can detect a hash range that has traffic above or below the expected range.

The hash value range in a layer is between 0~(S−1), here S represents total number of segments. Hence, the expected number of users per segment is 1/S. The proportion test may be performed on individual hash value to detect bad hash values. In other words, a total of S tests are performed to identify bad hash values. For each hash value, the following hypothesis can be evaluated:

H0: The probability of assigning a user unit to hash value i is $p_0=1/S$

H1: The probability of assigning a user unit to hash value i is $p_1 \neq 1/S$

Since the total user unit count N is often very large, one can use one-proportion z-test to test the hypotheses. The below equation represents z-test statistics:

$$z = \frac{\hat{p} - p_0}{\sqrt{p_0(1 - p_0)}} \sqrt{N},$$

where $$\hat{p} = \frac{\sum_{j=1}^{N} I_j}{N}$$

denotes the sample proportion of user counts with hash value i. Considering there are S separate tests running for each layer, one can control the family wise type I error using the Bonferroni approach. For example, the significant level for each test can be set as $\alpha=0.05/S$. If the p-value is below this threshold, it means the traffic assigned to the hash value i is significantly apart from expected frequency, which one can define it as an abnormal hash value; otherwise, the hash value i is taken as a normal hash value. The traffic distribution 1320 of a contaminated layer shown in FIG. 13 shows good and bad hash values.

Once the bad hash segments are detected, the disclosed system can flag the experiments/buckets or a free layer space falling on that hash range. Based on these signals, the experiment owners can be alerted on the impacted experiment/free layer space.

Referring back to FIG. 9, the uniformity tester 930 in this example may receive the collected metric data from the metric data collector 920 and perform a uniformity test to detect problematic layers. As discussed above, the uniformity test may use some test statistics that are calculated based on user assignment information.

The test model selector 950 in this example may obtain user assignment information, e.g. from the user assigner 560, and select one of the test models 955 based on the user assignment information. As discussed above, the test model may be based on a Pearson's Chi-Square test, a one-proportion z-test, or some other test. The test model selector 950 may inform the test statistics calculator 960 about the test model.

The test statistics calculator 960 in this example may calculate test statistics based on the test model. As discussed above, different test statistics may be calculated based on different test models. Calculated values of test statistics may be used to evaluate a hypothesis based on a predetermined threshold related to a significant level. The test statistics calculator 960 may send the calculated values of test statistics to the uniformity tester 930 for performing the uniformity test to detect problematic layers and to the proportion tester 940 for performing a proportion test to identify problematic hash ranges for each problematic layer.

After the uniformity tester 930 receives the calculated values of test statistics from the test statistics calculator 960 for each layer, the uniformity tester 930 may determine a p-value of the uniform test for the layer, and check whether this p-value is below the given significance level of $\alpha$ (e.g. 0.05). If so, then H0 is rejected, meaning the layer fails to pass the uniform test; otherwise if p-value>$\alpha$, the layer passes the uniform test with H0 accepted and H1 rejected. The uniformity tester 930 may inform the proportion tester 940 about the problematic layers that failed the uniform test. When no problematic layer is detected at the uniformity tester 930, the uniformity tester 930 may continue receiving the collected metric data from the metric data collector 920 for monitoring future experiment data.

The proportion tester 940 in this example may receive the collected metric data from the metric data collector 920, calculated values of the test statistics from the test statistics calculator 960, and information about the problematic layers from the uniformity tester 930. For each problematic layer that failed the uniform test, the proportion tester 940 may identify one or more problematic hash value ranges. For example, as shown in the traffic distribution 1320 of a contaminated layer in FIG. 13, there are more than four abnormal hash value ranges in the traffic distribution. These abnormal hash value ranges may include contaminated data which can cause the experiment results to be biased. The proportion tester 940 may send the information about bad hash segments to the experiment contamination corrector 580 for correction or prevention of the experiment contaminations.

Figure 10:
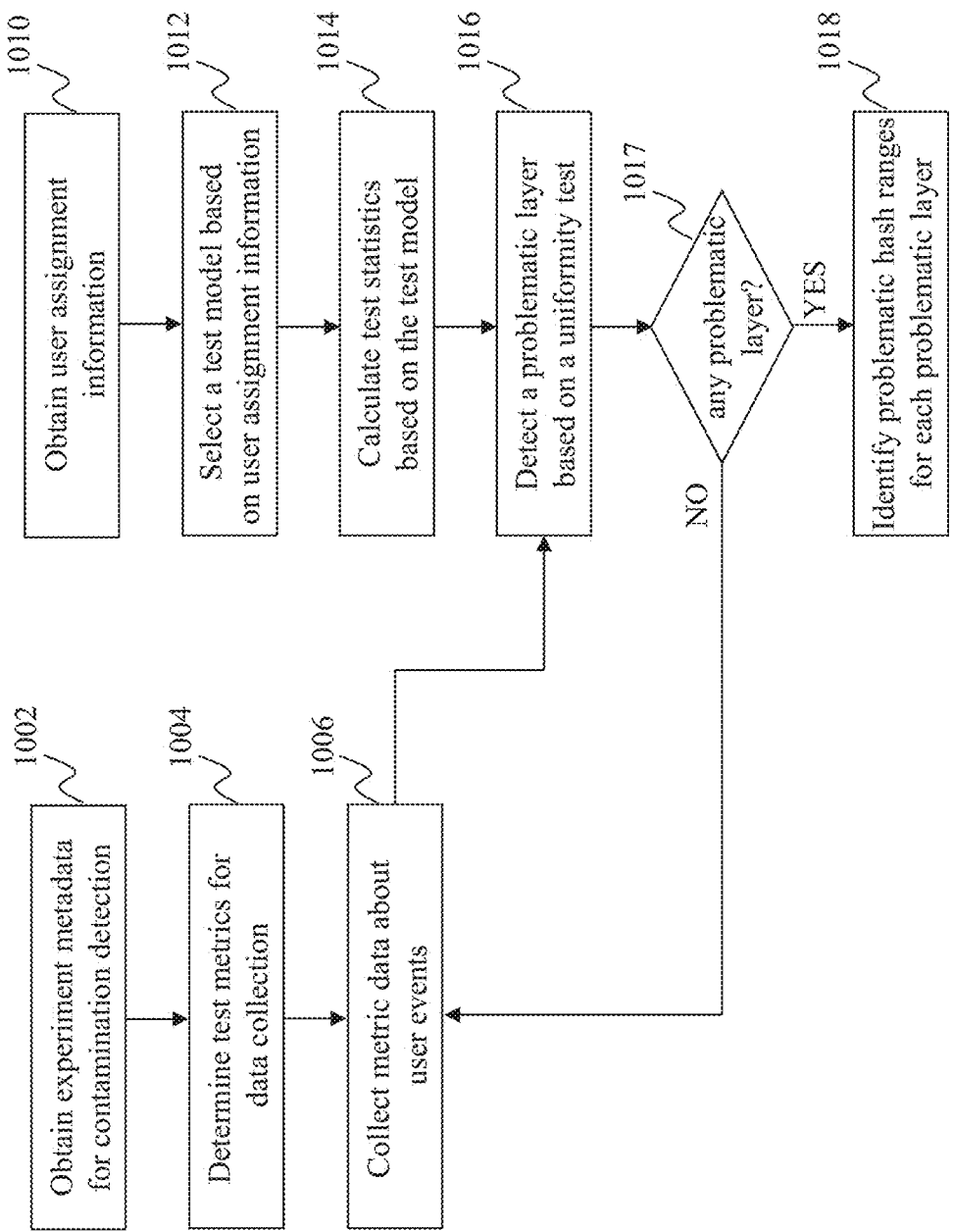
FIG. 10 is a flowchart of an exemplary process performed by an experiment contamination detector, according to an embodiment of the present teaching.

FIG. 10 is a flowchart of an exemplary process performed by an experiment contamination detector, e.g. the experiment contamination detector 570 in FIG. 9, according to an embodiment of the present teaching. Experiment metadata is obtained at 1002 for contamination detection. Test metrics are determined at 1004 for data collection. Metric data are collected at 1006 about user events. Then the process moves to 1016.

User assignment information is obtained at 1010. A test model is selected at 1012 based on the user assignment information. Test statistics are calculated at 1014 based on the test model. The system is trying to detect a problematic layer at 1016 based on a uniformity test. Then at 1017, it is determined whether there is any problematic layer is detected. If so, the process moves to 1018, where one or more problematic hash ranges are identified for each problematic layer. Otherwise, the process moves back to 1006 to collect more metric data.

Figure 11:
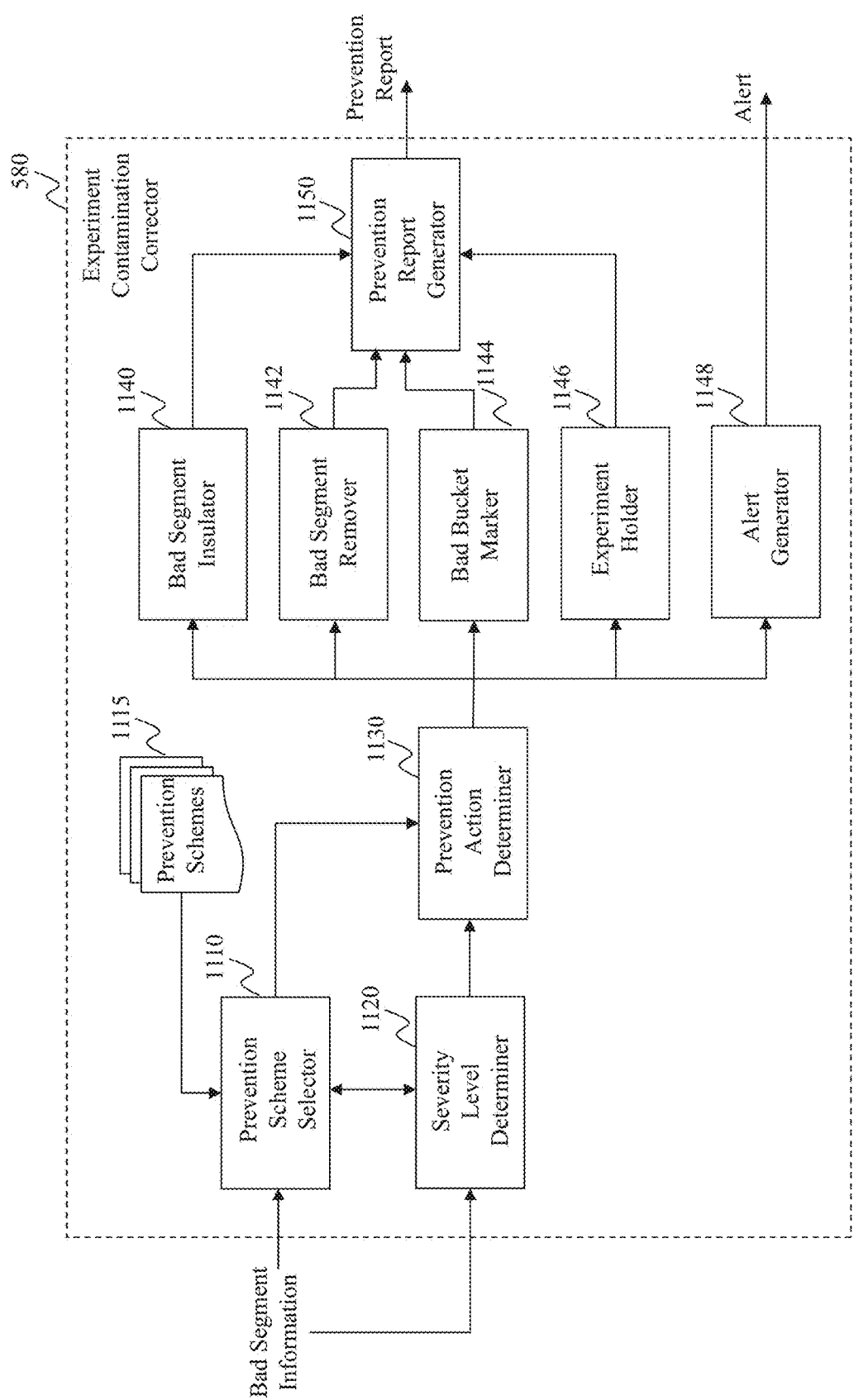
FIG. 11 illustrates an exemplary diagram of an experiment contamination corrector, according to an embodiment of the present teaching.

FIG. 11 illustrates an exemplary diagram of an experiment contamination corrector 580, according to an embodiment of the present teaching. As shown in FIG. 11, the experiment contamination corrector 580 includes a prevention scheme selector 1110, stored prevention schemes 1115, a severity level determiner 1120, a prevention action determiner 1130, a bad segment insulator 1140, a bad segment remover 1142, a bad bucket marker 1144, an experiment holder 1146, an alert generator 1148, and a prevention report generator 1150.

The prevention scheme selector 1110 in this example may obtain information about bad hash value segments, e.g. from the experiment contamination detector 570, and select one of the prevention schemes 1115 based on the obtained bad segment information. A prevention scheme may specify which action should be taken based on which condition. Different prevention schemes may be selected based on features of the bad segments. On one hand, the prevention scheme may be selected based on a severity level of a bad segment. On the other hand, the prevention scheme selector 1110 may send the selected prevention scheme to the severity level determiner 1120 for determining the severity level and to the prevention action determiner 1130 for determining a prevention action.

The severity level determiner 1120 in this example may determine a severity level for each bad segment or each bad bucket. In one example, this severity level is embedded in the bad segment information sent by the experiment contamination detector 570. For example, the p-value of the proportion test as discussed above for each problematic layer may be served as a severity level indicator. The severity level determiner 1120 may send the severity level to the prevention scheme selector 1110 for selecting a prevention scheme and/or to the prevention action determiner 1130 for determining a prevention action.

The prevention action determiner 1130 in this example may receive the selected prevention scheme from the prevention scheme selector 1110 and receive the severity level for each bad segment from the severity level determiner 1120. The prevention action determiner 1130 may determine a prevention action based on the selected prevention scheme and the severity level, for each bad segment. For example, experiments with high severity can be put on hold or in some cases the layer is reseeded to stop further impact. For the less severe issues, email/alerts can be sent out to the owners of the experiment.

The disclosed system may provide various options for correction. The experiment owner can set up a configurable threshold using which the system can automatically disable bad segments when the threshold is met. The system may also handle bad segments by removing bad segments from the system and reinstating bucket size after the removal of bad segments. The system may also flag these bad segments and associated buckets as blackout buckets in the data collection phase and skip them during data processing. This can prevent the impact of a bad bucket or experiment on the rest of the experiments in that layer. In practice, this system can identify and fix major issues related to instrumentation, traffic splitting, bucket stamping, and experiment unit loss. If contamination has occurred on a free space, the system can automatically disable these segments, thereby preventing the use of these segments for future experiments.

After the prevention action determiner 1130 determines a prevention action, the prevention action determiner 1130 may inform one or more other blocks (e.g. the bad segment insulator 1140, the bad segment remover 1142, the bad bucket marker 1144, the experiment holder 1146, and/or the alert generator 1148) in FIG. 11 to execute corresponding actions.

The bad segment insulator 1140 in this example may insulate the detected bad segment from experimentation. The bad segment remover 1142 in this example may remove the detected bad segment from experimentation. The bad bucket marker 1144 in this example may determine and mark bad buckets in experiments. The experiment holder 1146 in this example may hold or close experiments whose bad buckets exceed a threshold. The alert generator 1148 in this example may generate and provide an alert for experiment contamination, e.g. by sending an email alert, to the administrator 502. This may happen when the severity level is lower than a threshold.

The prevention report generator 1150 in this example may generate and provide a prevention report to the administrator 502, based on prevention actions taken on the bad segment insulator 1140, the bad segment remover 1142, the bad bucket marker 1144, and/or the experiment holder 1146.

Figure 12:
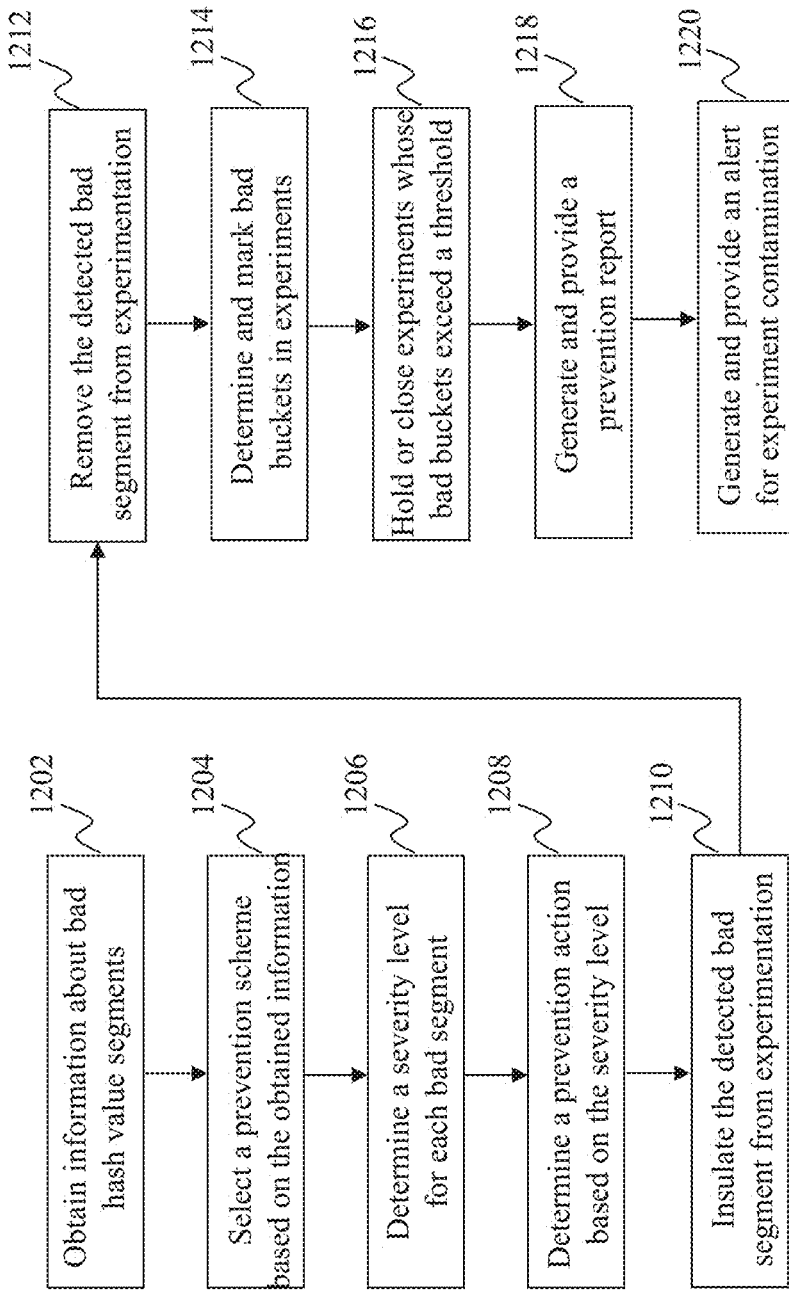
FIG. 12 is a flowchart of an exemplary process performed by an experiment contamination corrector, according to an embodiment of the present teaching.

FIG. 12 is a flowchart of an exemplary process performed by an experiment contamination corrector, e.g. the experiment contamination corrector 580 in FIG. 11, according to an embodiment of the present teaching. Information is obtained at 1202 about bad hash value segments. A prevention scheme is selected at 1204 based on the obtained information. A severity level is determined at 1206 for each bad segment. A prevention action is determined at 1208 based on the severity level. The detected bad segment is insulated at 1210 from experimentation. The detected bad segment is removed from experimentation at 1212. The detected bad segments or buckets are determined and marked at 1214 in experiments. The experiments are put on hold or closed at 1216 when the number of bad buckets included in the experiments exceeds a threshold. A prevention report is generated and provided at 1218. An alert is generated or provided at 1220 for experiment contamination.

It can be understood that the order of the steps shown in FIG. 6, FIG. 8, FIG. 10, and FIG. 12 may be changed according to different embodiments of the present teaching.

Figure 14:
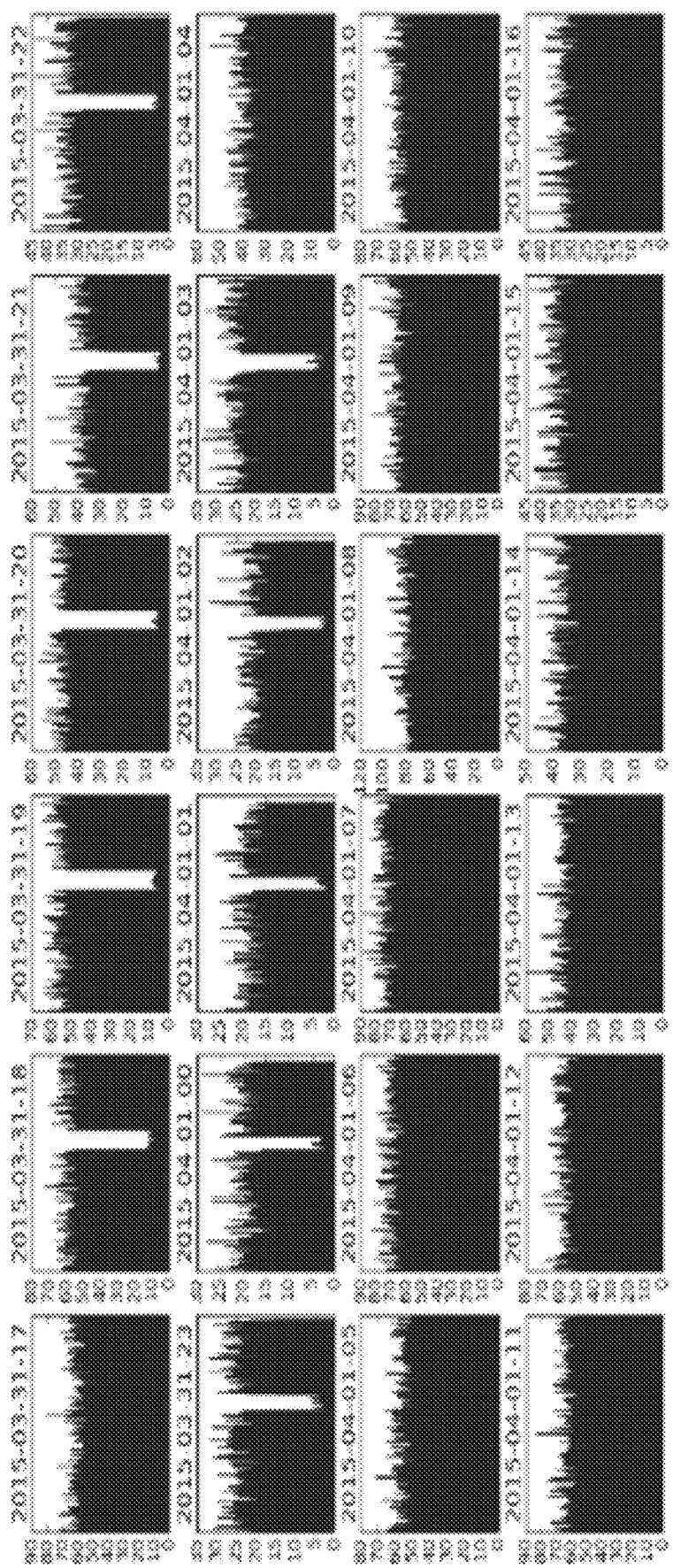
FIG. 14 illustrates an example of user distribution change over a period of a day, according to an embodiment of the present teaching.

FIG. 14 illustrates an example of user distribution change over a period of a day, according to an embodiment of the present teaching. This is based on an example where the system alerted the experiment owner on a sudden drop in traffic in a magazine layer. The product team investigated at their end and found their old magazine server, which was hosting old test buckets, were turned off. As a result, the user who fell in this bucket could not get into the new server. This was causing the users to bounce off site. Even though the system lost users for almost 9 hours as shown in FIG. 14, the system can get the traffic back to normal the next day. This was made possible by the early detection of contamination by the disclosed framework in the present teaching.

Figure 15:
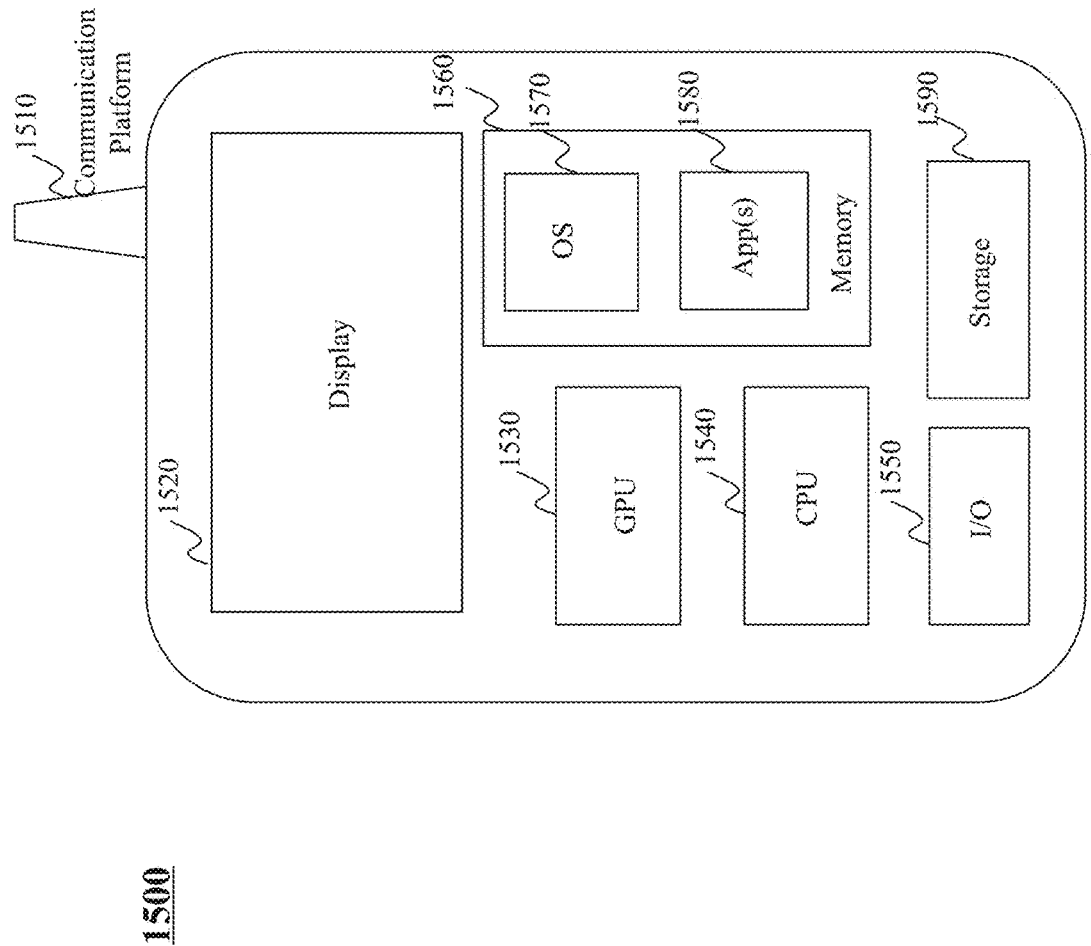
FIG. 15 depicts the architecture of a mobile device which can be used to implement a specialized system incorporating the present teaching.

FIG. 15 depicts the architecture of a mobile device which can be used to realize a specialized system implementing the present teaching. In this example, the user device on which web content or application is presented and interacted—with is a mobile device 1500, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1500 in this example includes one or more central processing units (CPUs) 1540, one or more graphic processing units (GPUs) 1530, a display 1520, a memory 1560, a communication platform 1510, such as a wireless communication module, storage 1590, and one or more input/output (I/O) devices 1550. Any other suitable component, including but not limited to a system bus or a controller (not shown), may also be included in the mobile device 1500. As shown in FIG. 15, a mobile operating system 1570, e.g., iOS, Android, Windows Phone, etc., and one or more applications 1580 may be loaded into the memory 1560 from the storage 1590 in order to be executed by the CPU 1540. The applications 1580 may include a browser or any other suitable mobile apps for receiving web content or application with tested features on the mobile device 1500. User interactions with the web content or application including tested features may be achieved via the I/O devices 1550 and provided to the online controlled experimentation engine 140 and/or other components of systems 100 and 200, e.g., via the network 120.

To implement various modules, units, and their functionalities described in the present disclosure, computer hardware platforms may be used as the hardware platform(s) for one or more of the elements described herein (e.g., the online controlled experimentation engine 140, the web/application server 130 and/or other components of systems 100 and 200 described with respect to FIGS. 1-14). The hardware elements, operating systems and programming languages of such computers are conventional in nature, and it is presumed that those skilled in the art are adequately familiar therewith to adapt those technologies about automatic detection and prevention of quality issues in online experiments as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 16:
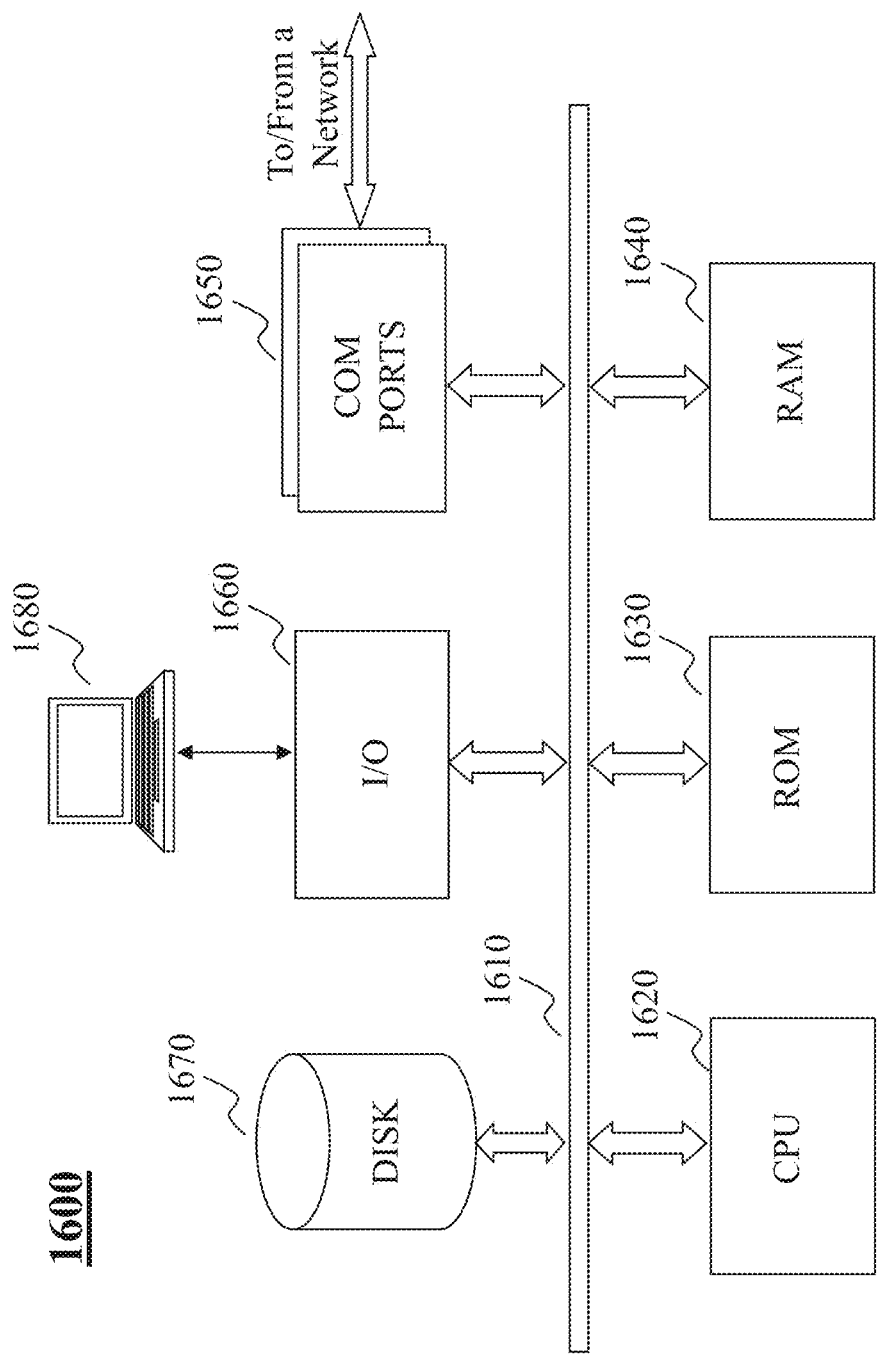
FIG. 16 depicts the architecture of a computer which can be used to implement a specialized system incorporating the present teaching.

FIG. 16 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1600 may be used to implement any component of the techniques of automatic detection and prevention of quality issues in online experiments, as described herein. For example, the web/application server 130, the online controlled experimentation engine 140, etc., may be implemented on a computer such as computer 1600, via its hardware, software program, firmware, or a combination thereof. Although only one such computer is shown, for convenience, the computer functions relating to automatic detection and prevention of quality issues in online experiments as described herein may be implemented in a distributed fashion on a number of similar platforms, to distribute the processing load.

The computer 1600, for example, includes COM ports 1650 connected to and from a network connected thereto to facilitate data communications. The computer 1600 also includes a central processing unit (CPU) 1620, in the form of one or more processors, for executing program instructions. The exemplary computer platform includes an internal communication bus 1610, program storage and data storage of different forms, e.g., disk 1670, read only memory (ROM) 1630, or random access memory (RAM) 1640, for various data files to be processed and/or communicated by the computer, as well as possibly program instructions to be executed by the CPU. The computer 1600 also includes an I/O component 1660, supporting input/output flows between the computer and other components therein such as user interface elements 1680. The computer 1600 may also receive programming and data via network communications.

Hence, aspects of the methods of automatic detection and prevention of quality issues in online experiments, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with automatic detection and prevention of quality issues in online experiments. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, automatic detection and prevention of quality issues in online experiments as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one computing device each of which has at least one processor, storage, and a communication platform connected to a network for managing online experiments, the method comprising:

creating, by an online controlled experimentation engine, a plurality of experiment layers, wherein each experiment layer includes and runs at least one online experiment on a website, and each online experiment includes one or more buckets associated with one or more features to be experimented on;

assigning, by the online controlled experimentation engine, via the website embedded with a randomization algorithm on a load balancer, by splitting traffic between the one or more buckets, based on a bucket size, a plurality of identifiers, each of which corresponds to one of a plurality of online users, to a corresponding bucket in each experiment layer such that a user is simultaneously associated with multiple online experiments in different experiment layers;

collecting user event data related to the plurality of experiment layers from the plurality of online users;

performing a two-stage test to determine health of the plurality of experiment layers, wherein the two-stage test comprises:

automatically detecting one or more contaminated experiment layers from the plurality of experiment layers by computing, based on the user event data, a uniform distribution test for each of the plurality of experiment layers, and in response to the one or more contaminated experiment layers from the plurality of experiment layers being detected, automatically detecting, for each of the detected one or more contaminated experiment layers, one or more contaminated buckets by computing, based on the user event data, a proportion test of identifiers assigned to each bucket in each of the one or more contaminated experiment layers; and in response to determining that a severity level of at least one of the one or more contaminated buckets exceeds a threshold severity level, performing, by the online controlled experimentation engine, contamination correction by:

automatically removing the at least one of the one or more contaminated buckets from a corresponding online experiment to prevent the at least one of the one or more contaminated buckets from contaminating the corresponding online experiment, and reinstating the bucket size in the corresponding online experiment.

2. The method of claim 1, wherein the plurality of identifiers comprise a plurality of experiment unit identifiers (IDs), the step of assigning the plurality of identifiers comprises:

determining, for each of the plurality of online users, a corresponding experiment unit ID of the plurality of experiment unit IDs;

determining a random seed for each experiment layer;

calculating, for each experiment layer, a hash value associated with each of the plurality of identifiers based on the corresponding experiment unit ID and the random seed; and assigning the identifier to the corresponding bucket in each experiment layer based on the calculated hash value.

3. The method of claim 1, wherein the step of automatically detecting the one or more contaminated experiment layers comprises:

calculating a health level of each experiment layer based on the uniform distribution test which is computed for each experiment layer based on the user event data;

determining one or more unhealthy experiment layers based on the health level of each experiment layer; and determining, for each of the one or more unhealthy experiment layers, at least one contaminated bucket, wherein the one or more contaminated buckets comprise the at least one contaminated bucket determined in each of the one or more unhealthy experiment layers.

4. The method of claim 3, wherein the uniform distribution test is used to determine whether a traffic distribution across different buckets in a given experiment layer is uniform.

5. The method of claim 3, wherein the proportion test is used to determine a probability of assigning an online user to each bucket in each experiment layer, and the proportion test identifies problematic hash ranges for each of the detected one or more contaminated experiment layers.

6. The method of claim 1, further comprising:

selecting a prevention scheme based on each of the one or more contaminated buckets that were detected;

determining the severity level for each of the one or more contaminated buckets; and determining a prevention action to be applied to the at least one of the one or more contaminated buckets based on the prevention scheme and the at least one of the one or more contaminated buckets exceeding the threshold severity level, wherein the prevention action comprises:

automatically removing the at least one of the one or more contaminated buckets from the corresponding online experiment, and after the at least one of the one or more contaminated buckets is removed, reinstating the bucket size in the corresponding online experiment.

7. The method of claim 6, wherein each experiment layer comprises a plurality of online experiments, and wherein the prevention action further comprises:

holding or closing the corresponding online experiment when a condition related to all contaminated buckets in the corresponding online experiment is met.

8. A system having at least one processor, storage, and a communication platform connected to a network for managing online experiments, comprising:

a multi-layer experiments creator of an online controlled experimentation engine configured for creating a plurality of experiment layers, wherein each experiment layer includes and runs at least one online experiment on a website, and each online experiment includes one or more buckets associated with one or more features to be experimented on;

a user assigner of the online controlled experimentation engine configured for assigning, via the website embedded with a randomization algorithm on a load balancer, by splitting traffic between the one or more buckets, based on a bucket size, a plurality of identifiers, each of which corresponds to one of a plurality of online users, to a corresponding bucket in each experiment layer such that a user is simultaneously associated with multiple online experiments in different experiment layers;

a grid based event analyzer configured for collecting user event data related to the plurality of experiment layers from the plurality of online users; and an experiment contamination detector configured for:

performing a two-stage test to determine health of the plurality of experiment layers, wherein the two-stage test comprises:

automatically detecting one or more contaminated experiment layers from the plurality of experiment layers by computing, based on the user event data, a uniform distribution test for each of the plurality of experiment layers, and in response to the one or more contaminated experiment layers from the plurality of experiment layers being detected, automatically detecting, for each of the detected one or more contaminated experiment layers, one or more contaminated buckets by computing, based on the user event data, a proportion test of identifiers assigned to each bucket in each of the one or more contaminated experiment layers; and a prevention action determiner of the online controlled experimentation engine configured for performing contamination correction by:
in response to determining that a severity level of at least one of the one or more contaminated buckets exceeds a threshold severity level, automatically removing the at least one of the one or more contaminated buckets from a corresponding online experiment to prevent the at least one of the one or more contaminated buckets from contaminating the corresponding online experiment, and
reinstating the bucket size in the corresponding online experiment.

9. The system of claim 8, wherein the plurality of identifiers comprise a plurality of experiment unit identifiers (IDs), the user assigner comprises:
an experiment unit ID determiner configured for determining, for each of the plurality of online users, a corresponding experiment unit ID of the plurality of experiment unit IDs;
a random seed determiner configured for determining a random seed for each experiment layer;
a hash value calculator configured for calculating, for each experiment layer, a hash value associated with each of the plurality of identifiers based on the corresponding experiment unit ID and the random seed; and
a bucket assigner configured for assigning the identifier to the corresponding bucket in each experiment layer based on the calculated hash value.

10. The system of claim 8, wherein the experiment contamination detector comprises:
a test statistics calculator configured for calculating a health level of each experiment layer based on the uniform distribution test which is computed for each experiment layer based on the user event data;
a uniformity tester configured for determining one or more unhealthy experiment layers based on the health level of each experiment layer; and
a proportion tester configured for performing the proportion test to determine, for each of the one or more unhealthy experiment layers, at least one contaminated bucket, wherein the one or more contaminated buckets comprise the at least one contaminated bucket determined in each of the one or more unhealthy experiment layers.

11. The system of claim 10, wherein the uniform distribution test is used to determine whether a traffic distribution across different buckets in a given experiment layer is uniform.

12. The system of claim 10, wherein the proportion test is used to determine a probability of assigning an online user to each bucket in each experiment layer, and the proportion test identifies problematic hash ranges for each of the detected one or more contaminated experiment layers.

13. The system of claim 8, further comprising:
a prevention scheme selector configured for selecting a prevention scheme based on each of the one or more contaminated buckets that were detected; and
a severity level determiner configured for determining the severity level for each of the one or more contaminated buckets;

wherein the prevention action determiner is configured for determining a prevention action to be applied to the at least one of the one or more contaminated buckets based on the prevention scheme and the at least one of the one or more contaminated buckets exceeding the threshold severity level, wherein the prevention action comprises:
automatically removing the at least one of the one or more contaminated buckets from the corresponding online experiment, and
after the at least one of the one or more contaminated buckets is removed, reinstating the bucket size in the corresponding online experiment.

14. The system of claim 13, wherein each experiment layer comprises a plurality of online experiments, and wherein the prevention action further comprises:
holding or closing the corresponding online experiment when a condition related to all contaminated buckets in the corresponding online experiment is met.

15. A non-transitory machine-readable medium having information recorded thereon for managing online experiments, wherein the information, when read by an online controlled experimentation engine, causes the online controlled experimentation engine to perform operations comprising:
creating a plurality of experiment layers, wherein each experiment layer includes and runs at least one online experiment on a website, and each online experiment includes one or more buckets associated with one or more features to be experimented on;
assigning, via the website embedded with a randomization algorithm on a load balancer, by splitting traffic between the one or more buckets, based on a bucket size, a plurality of identifiers, each of which corresponds to one of a plurality of online users, to a corresponding bucket in each experiment layer such that a user is simultaneously associated with multiple online experiments in different experiment layers;
collecting user event data related to the plurality of experiment layers from the plurality of online users;
performing a two-stage test to determine health of the plurality of experiment layers, wherein the two-stage test comprises:
automatically detecting one or more contaminated experiment layers from the plurality of experiment layers by computing, based on the user event data, a uniform distribution test for each of the plurality of experiment layers, and
in response to the one or more contaminated experiment layers from the plurality of experiment layers being detected, automatically detecting, for each of the detected one or more contaminated experiment layers, one or more contaminated buckets by computing, based on the user event data, a proportion test of identifiers assigned to each bucket in each of the one or more contaminated experiment layers; and
in response to determining that a severity level of at least one of the one or more contaminated buckets exceeds a threshold severity level, performing contamination correction by:
automatically removing the at least one of the one or more contaminated buckets from a corresponding online experiment to prevent the at least one of the one or more contaminated buckets from contaminating the corresponding online experiment, and
reinstating the bucket size in the corresponding online experiment.

16. The medium of claim 15, wherein the plurality of identifiers comprise a plurality of experiment unit identifiers (IDs), the step of assigning the plurality of identifiers comprises:
- determining, for each of the plurality of online users, a corresponding experiment unit ID of the plurality of experiment unit IDs;
- determining a random seed for each experiment layer;
- calculating, for each experiment layer, a hash value associated with each of the plurality of identifiers based on the corresponding experiment unit ID and the random seed; and
- assigning the identifier to the corresponding bucket in each experiment layer based on the calculated hash value.

17. The medium of claim 15, wherein the step of automatically detecting comprises:
- calculating a health level of each experiment layer based on the uniform distribution test which is computed for each experiment layer based on the user event data;
- determining one or more unhealthy experiment layers based on the health level of each experiment layer; and
- determining, for each of the one or more unhealthy experiment layers, at least one contaminated bucket, wherein the one or more contaminated buckets comprise the at least one contaminated bucket determined in each of the one or more unhealthy experiment layers.

18. The medium of claim 17, wherein the uniform distribution test is used to determine whether a traffic distribution across different buckets in a given experiment layer is uniform.

19. The medium of claim 17, wherein the proportion test is used to determine a probability of assigning an online user to each bucket in each experiment layer, and the proportion test identifies problematic hash ranges for each of the detected one or more contaminated experiment layers.

20. The medium of claim 15, wherein the operations further comprise:
- selecting a prevention scheme based on each of the one or more contaminated buckets that were detected;
- determining the severity level for each of the one or more contaminated buckets; and
- determining a prevention action to be applied to the at least one of the one or more contaminated buckets based on the prevention scheme and the at least one of the one or more contaminated buckets exceeding the threshold severity level, wherein the prevention action comprises:
- automatically removing the at least one of the one or more contaminated buckets from the corresponding online experiment, and
- after the at least one of the one or more contaminated buckets is removed, reinstating the bucket size in the corresponding online experiment.

21. The medium of claim 20, wherein each experiment layer comprises a plurality of online experiments, and wherein the prevention action further comprises:
- holding or closing the corresponding online experiment when a condition related to all contaminated buckets in the corresponding online experiment is met.

* * * * *